US008229017B1

(12) United States Patent
Lee et al.

(10) Patent No.: US 8,229,017 B1
(45) Date of Patent: Jul. 24, 2012

(54) TRANSMIT BEAMFORMING UTILIZING CHANNEL ESTIMATION MATRIX DECOMPOSITION FEEDBACK IN A WIRELESS MIMO COMMUNICATION SYSTEM

(75) Inventors: Jungwon Lee, Cupertino, CA (US); Rohit U. Nabar, Sunnyvale, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 840 days.

(21) Appl. No.: 12/330,268

(22) Filed: Dec. 8, 2008

Related U.S. Application Data

(60) Provisional application No. 61/013,499, filed on Dec. 13, 2007.

(51) Int. Cl.
   *H04B 7/02* (2006.01)
(52) U.S. Cl. .......... 375/267; 342/432; 367/138; 706/24
(58) Field of Classification Search .................. None
   See application file for complete search history.

(56) References Cited

U.S. PATENT DOCUMENTS

| 6,760,388 B2 | 7/2004 | Ketchum et al. |
| 7,065,146 B1 | 6/2006 | Lou et al. |
| 7,194,042 B2 | 3/2007 | Walton et al. |
| 2005/0185728 A1 | 8/2005 | Wallace et al. |
| 2006/0256848 A1 | 11/2006 | Medvedev et al. |
| 2007/0165737 A1 | 7/2007 | Sarrigeorgidis |
| 2008/0080449 A1* | 4/2008 | Huang et al. .............. 370/342 |
| 2008/0089396 A1* | 4/2008 | Zhang et al. .............. 375/220 |
| 2008/0219373 A1 | 9/2008 | Zhang et al. |

FOREIGN PATENT DOCUMENTS

| WO | WO 2007/037716 A1 | 4/2007 |
| WO | WO2007/103085 | 9/2007 |

OTHER PUBLICATIONS

U.S. Appl. No. 11/627,265, filed Jan. 25, 2007, Nabar et al.
U.S. Appl. No. 11/598,563, filed Nov. 13, 2006, Nabar et al.
U.S. Appl. No. 11/681,548, filed Mar. 2, 2007, Nabar et al.
U.S. Appl. No. 12/098,222, filed Apr. 4, 2008 Zhang et al.
U.S. Appl. No. 12/111,129, filed Apr. 28, 2009, Sarrigeorgidis et al.
U.S. Appl. No. 12/131,768, filed Jun. 2, 2008, Nabar et al.
U.S. Appl. No. 12/168,595, filed Jul. 7, 2008, Nabar et al.
U.S. Appl. No. 12/171,067, filed Jul. 10, 2008, Zhang et al.
U.S. Appl. No. 12/059,846, filed Mar. 31, 2008, Zhang et al.
U.S. Appl. No. 12/098,222, filed Apr. 4, 2008, Zhang et al.

(Continued)

*Primary Examiner* — David C. Payne
*Assistant Examiner* — Adolf DSouza

(57) ABSTRACT

A method and apparatus for a communication system having a first transceiver device having a first plurality of antennas and a second transceiver device having a second plurality of antennas determines a channel estimation matrix describing a forward channel in which a signal travels from the first transceiver device to the second transceiver device. The channel estimation matrix is decomposed to derive a unitary matrix and an upper triangular matrix. A precoding matrix is developed using the upper triangular matrix, and the precoding matrix is used to control transmission of a modulated signal.

31 Claims, 9 Drawing Sheets

OTHER PUBLICATIONS

IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band," *The Institute of Electrical and Electronics Engineers, Inc.*, (1999).

"Part 16: Air Interface for Fixed Broadband Wireless Access Systems- Amendment 2: Medium Access Control Modifications and Additional Physical Layer Specifications for 2-11 GHz," *The Institute of Electrical and Electronics Engineers, Inc.*, (2003).

IEEE Std 802.11b-2001 (Corrigendum to IEEE Std 802.11b-1999) "IEEE Standard for Information technology- Telecommunications and information exchange between systems- Local and metropolitan area networks-Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

"Draft Supplement to Standard [for] Information technology-Telecommunications and information exchange between systems-Local and metropolitan area networks-Specific requirements, Part 11: Wireless LAN Medium Access Control (MAC) and Physical Layer (PHY) specifications: Further Higher-Speed Physical Layer Extension in the 2.4 GHz Band, " IEEE Std. 802.11g/D2.8, May 2002.

IEEE Standard for Local and metropolitan area networks: Part 16: Air Interface for Fixed and Mobile Broadband Wireless Access Systems/Amendment 2: Physical and Medium Access Control Layers for Combined Fixed and Mobile operation in Licensed Bands and Corrigendum 1, IEEE Std. 802.16e and IEEE Std. 802.16 2004/Cor 1-2005, Feb. 28, 2006.

Cavallaro et al., "VLSI Implementation of a Cordic SVD Processor", Eighth Biennial University/Government/Industry Symposium, pp. 256-60, 1989.

802.11 Working Group: "IEEE 802.11n Part 11: Wireless LAN Medium Access Control (MAC) and Physical Layer (PHY) specifications: Enhancements for Higher Throughput," *IEEE* Mar. 2006, pp. 119-125.

International Search Report from International Application No. PCT/US07/78780 dated Mar. 10, 2008.

Written Opinion from International Application No. PCT/US07/78780 dated Mar. 10, 2008.

International Preliminary Report on Patentability for Application No. PCT/US2007/078780, dated Mar. 24, 2009.

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

IEEE Std 802.11g/D8.2, Apr. 2003 (Supplement to ANSI/IEEE Std 802.11, 1999 (Reaff 2003)) "Draft Supplement to Standard [for] Information technology-Telecommunications and information exchange between systems-Local and metropolitan area networks-Specific requirements, Part 11: Wireless LAN Medium Access Control (MAC) and Physical Layer (PHY) specifications: Further Higher Data Rate Extension in the 2.4 GHz Band, "*The Institute of Electrical and Electronics Engineers, Inc.*, Apr. 2003.

S. A. Mujtaba, "IEEE P802.11—Wireless LANS, TGn Sync Proposal Technical Specification," doc.: IEEE 802.11—04/0889r6, May 2005.

IEEE Std 802.16a-2003 (Amendment to IEEE Std 802.16-2001) "IEEE Standard for Local and metropolitan area networks: Part 16: Air Interface for Fixed Broadband Wireless Access Systems-Amendment 2: Medium Access Control Modifications and Additional Physical Layer Specifications for 2-11 GHZ," *The Institute of Electrical and Electronics Engineers, Inc.*, Apr. 1, 2003.

\* cited by examiner

PRIOR ART

TRANSMIT BEAMFORMING UTILIZING CHANNEL ESTIMATION MATRIX DECOMPOSITION FEEDBACK IN A WIRELESS MIMO COMMUNICATION SYSTEM

RELATED APPLICATION

This is a regular-filed application which is based on and claims priority to U.S. Provisional Patent Application Ser. No. 61/013,499, entitled "Beam-Forming With Essential Channel Feedback," which was filed on Dec. 13, 2007, the entire disclosure of which is hereby incorporated by reference herein.

FIELD OF THE TECHNOLOGY

The disclosure relates generally to wireless communication systems and, more particularly, to techniques for beamforming in a multiple-input, multiple-output wireless communication system.

DESCRIPTION OF THE RELATED ART

An ever-increasing number of relatively inexpensive, low power wireless data communication services, networks and devices have been made available over the past number of years, promising near wire speed transmission and reliability. Various wireless technology is described in detail in the 802.11 IEEE Standard, including for example, the IEEE Standard 802.11a (1999) and its updates and amendments, the IEEE Standard 802.11g (2003), as well as the IEEE Standard 802.11n now in the process of being adopted, all of which are collectively incorporated herein fully by reference. These standards have been or are in the process of being commercialized with the promise of 54 Mbps or more effective bandwidth, making them a strong competitor to traditional wired Ethernet and the more ubiquitous "802.11b" or "WiFi" 11 Mbps mobile wireless transmission standard.

Generally speaking, transmission systems compliant with the IEEE 802.11a and 802.11g or "802.11a/g" as well as the 802.11n standards achieve their high data transmission rates using Orthogonal Frequency Division Modulation or OFDM encoded symbols mapped up to a 64 quadrature amplitude modulation (QAM) multi-carrier constellation. The use of OFDM divides the overall system bandwidth into a number of frequency sub-bands or channels, with each frequency sub-band being associated with a respective sub-carrier upon which data may be modulated. Thus, each frequency sub-band of the OFDM system may be viewed as an independent transmission channel within which to send data, thereby increasing the overall throughput or transmission rate of the communication system.

Generally, transmitters used in the wireless communication systems that are compliant with the aforementioned 802.11a/802.11g/802.11n standards as well as other standards such as the IEEE 802.16a Standard, perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a large peak-to-average ratio (PAR).

Likewise, the receivers used in the wireless communication systems that are compliant with the aforementioned 802.11a/802.11g/802.11n and 802.16a IEEE standards generally include an RF receiving unit that performs RF downconversion and filtering of the received signals (which may be performed in one or more stages), and a baseband processor unit that processes the OFDM encoded symbols bearing the data of interest. Generally, the digital form of each OFDM symbol presented in the frequency domain is recovered after baseband downconversion, conventional analog to digital conversion and Fast Fourier Transformation of the received time domain analog signal. Thereafter, the baseband processor performs frequency domain equalization (FEQ) and demodulation to recover the transmitted symbols, and these symbols are then processed in a viterbi decoder to estimate or determine the most likely identity of the transmitted symbol. The recovered and recognized stream of symbols is then decoded, which may include deinterleaving and error correction using any of a number of known error correction techniques, to produce a set of recovered signals corresponding to the original signals transmitted by the transmitter.

In wireless communication systems, the RF modulated signals generated by the transmitter may reach a particular receiver via a number of different propagation paths, the characteristics of which typically change over time due to the phenomena of multi-path and fading. Moreover, the characteristics of a propagation channel differ or vary based on the frequency of propagation. To compensate for the time varying, frequency selective nature of the propagation effects, and generally to enhance effective encoding and modulation in a wireless communication system, each receiver of the wireless communication system may periodically develop or collect channel state information (CSI) for each of the frequency channels, such as the channels associated with each of the OFDM sub-bands discussed above. Generally speaking, CSI is information defining or describing one or more characteristics about each of the OFDM channels (for example, the gain, the phase and the SNR of each channel). Upon determining the CSI for one or more channels, the receiver may send this CSI back to the transmitter, which may use the CSI for each channel to precondition the signals transmitted using that channel so as to compensate for the varying propagation effects of each of the channels.

An important part of a wireless communication system is therefore the selection of the appropriate data rates, and the coding and modulation schemes to be used for a data transmission based on channel conditions. Generally speaking, it is desirable to use the selection process to maximize throughput while meeting certain quality objectives, such as those defined by a desired frame error rate (FER), latency criteria, etc.

To further increase the number of signals which may be propagated in the communication system and/or to compensate for deleterious effects associated with the various propagation paths, and to thereby improve transmission performance, it is known to use multiple transmit and receive antennas within a wireless transmission system. Such a system is commonly referred to as a multiple-input, multiple-output (MIMO) wireless transmission system and is specifically provided for within the 802.11n IEEE Standard now being adopted. Generally speaking, the use of MIMO technology produces significant increases in spectral efficiency and link reliability, and these benefits generally increase as the number of transmission and receive antennas within the MIMO system increases.

In addition to the frequency channels created by the use of OFDM, a MIMO channel formed by the various transmit and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth and may therefore achieve different SNRs at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band.

However, instead of using the various different transmission and receive antennas to form separate spatial channels on which additional information is sent, better transmission and reception properties can be obtained in a MIMO system by using each of the various transmission antennas of the MIMO system to transmit the same signal while phasing (and amplifying) this signal as it is provided to the various transmission antennas to achieve beamforming or beamsteering. Generally speaking, beamforming or beamsteering creates a spatial gain pattern having one or more high gain lobes or beams (as compared to the gain obtained by an omni-directional antenna) in one or more particular directions, while reducing the gain over that obtained by an omni-directional antenna in other directions. If the gain pattern is configured to produce a high gain lobe in the direction of each of the receiver antennas, the MIMO system can obtain better transmission reliability between a particular transmitter and a particular receiver, over that obtained by single transmitter-antenna/receiver-antenna systems.

There are many known techniques for determining a steering matrix specifying the beamsteering coefficients that need to be used to properly condition the signals being applied to the various transmission antennas so as to produce the desired transmit gain pattern at the transmitter. As is known, these coefficients may specify the gain and phasing of the signals to be provided to the transmitter antennas to produce high gain lobes in particular or predetermined directions. These techniques include, for example, transmit-MRC (maximum ratio combining), singular value decomposition (SVD) and Tomlinson-Harashima Precoding (THP). While it is known to perform beamforming in a MIMO system in a manner that uses all of the available receiver and transmitter antennas in the MIMO system, which thereby maximizes transmission reliability, the calculations and processing overhead associated with computing the beamsteering coefficients or the steering matrix increases significantly as the number of transmission and receiver antennas increases. As a result, beamforming in a MIMO system may significantly increase the system complexity and processing overhead when a large number of transmission and receiver antennas are present.

Beamforming may be conducted explicitly or implicitly. In explicit beamforming, the receiver (or beamformee) feeds back information known (or estimated) about the forward channel to the transmitter (beamformer) in the form of a channel estimation matrix, and the beamformer conducts precoding based on the channel estimation matrix to calculate the steering matrix. Alternatively, the beamformee conducts the precoding and feeds back the steering matrix (also referred to as the precoding matrix) or the steering matrix index to the beamformer. In implicit beamforming, the beamformer estimates the forward channel based on information known about the reverse channel.

With explicit beamforming, each element of the channel estimation matrix or the precoding matrix is fed back to the beamformer via a feedback channel between the beamformer and beamformee. Generally, the beamformer allocates the bandwidth for the feedback channel based on the number of transmission and receiver antennas. For a large number of transmission and receiver antennas, the channel estimation matrix may be large and its values may include complex numbers, thereby increasing the amount of feedback, and utilizing much or all of the allocated bandwidth or otherwise requiring bandwidth allocation sufficient to accommodate the channel estimation matrix. While a precoding matrix requires less feedback than the channel estimation matrix, the number and complexity of the elements may still utilize a large amount of bandwidth in the feedback channel.

SUMMARY

In one embodiment, a method of providing forward channel matrix information within a communication system is disclosed. The communication system includes a first transceiver device having a first plurality of antennas and a second transceiver device having a second plurality of antennas. The method includes determining a channel estimation matrix describing a forward channel in which a signal travels from the first transceiver device to the second transceiver device, decomposing the channel estimation matrix to derive a unitary matrix and an upper triangular matrix at the second transceiver device, and transmitting at least a portion of the upper triangular matrix to the first transceiver device. The upper triangular matrix is used to develop a precoding matrix, and the precoding matrix is used to control transmission of a modulated signal via the first plurality of antennas.

In another embodiment, an apparatus is disclosed. The apparatus includes a controller configured to determine a description of a forward channel based on a signal from a beamformer, and a QR decomposition processor configured to decompose the description of the forward channel. The decomposed description of the forward channel comprises a Q matrix and an R matrix, and the R matrix comprises diagonal, upper-diagonal and lower-diagonal matrix elements. The controller is configured to feed back to the beamformer a precoding matrix calculated from the R matrix and/or the diagonal and upper-diagonal matrix elements of the R matrix. The precoding matrix is to be used by the beamformer to produce a transmit gain pattern. The precoding matrix and/or the diagonal and upper-diagonal matrix elements of the R matrix are fed back to the beamformer via a feedback channel resource having a bandwidth allocated to channel state information feedback.

In a further embodiment, an apparatus is disclosed. The apparatus includes a beamforming network coupled to a plurality of transmission antennas, and a controller configured to control the beamforming network using a precoding matrix so as to produce a transmit gain pattern having one or more high gain lobes via the plurality of transmission antennas based on the precoding matrix. The precoding matrix is calculated from an R matrix derived from a QR decomposition of a description of a forward channel, and the decomposed description of the forward channel comprises a Q matrix and the R matrix.

In yet another embodiment, a method of beamforming using forward channel matrix information within a communication system is disclosed. The communication system has a first transceiver device having a first plurality of antennas and a second transceiver device having a second plurality of antennas. The method includes receiving a precoding matrix from the second transceiver device and/or at least a portion of an upper triangular matrix. The precoding matrix is calculated from an upper triangular matrix derived from a decomposition of a channel estimation matrix describing a forward channel in which a signal travels from the first transceiver device to the second transceiver device. The decomposed description of the forward channel comprises a unitary matrix and the upper triangular matrix, and the upper triangular matrix comprising diagonal, upper-diagonal and lower-diagonal matrix elements. A precoding matrix is developed from the at least a portion of upper triangular matrix, if at least a portion of the upper triangular matrix is received from the second transceiver device. Transmission of a modulated signal via the first plurality of antennas is controlled using the developed precoding matrix. Transmission of a modulated signal via the first plurality of antennas is controlled using the received precoding matrix, if the precoding matrix is received from the second transceiver device.

DETAILED DESCRIPTION

While the beamforming techniques described herein for processing and effecting a wireless data transmission are described as being used in communication systems that use one of the IEEE Standard 802.11x communication standards, these techniques may be used in various other types of wireless communication systems and are not limited to those conforming to one or more of the IEEE Standard 802.11x standards. Moreover, although the beamforming techniques described herein are described as being used in communication systems utilizing OFDM modulation, these techniques may utilized with a variety of other types of modulation schemes as well. In addition, the techniques for reduced feedback disclosed herein may be used for purposes other than beamforming. For example, the forward channel matrix information may be developed and/or provided to RF chain calibration in a wireless system (e.g., WiFi) or for link adaptation (e.g., transmission rate selection by the transceiver device receiving the feedback). Accordingly, it should be understood that beamforming in an exemplary use of the techniques described herein, and also that utilization of the techniques extend beyond beamforming.

Figure 1:
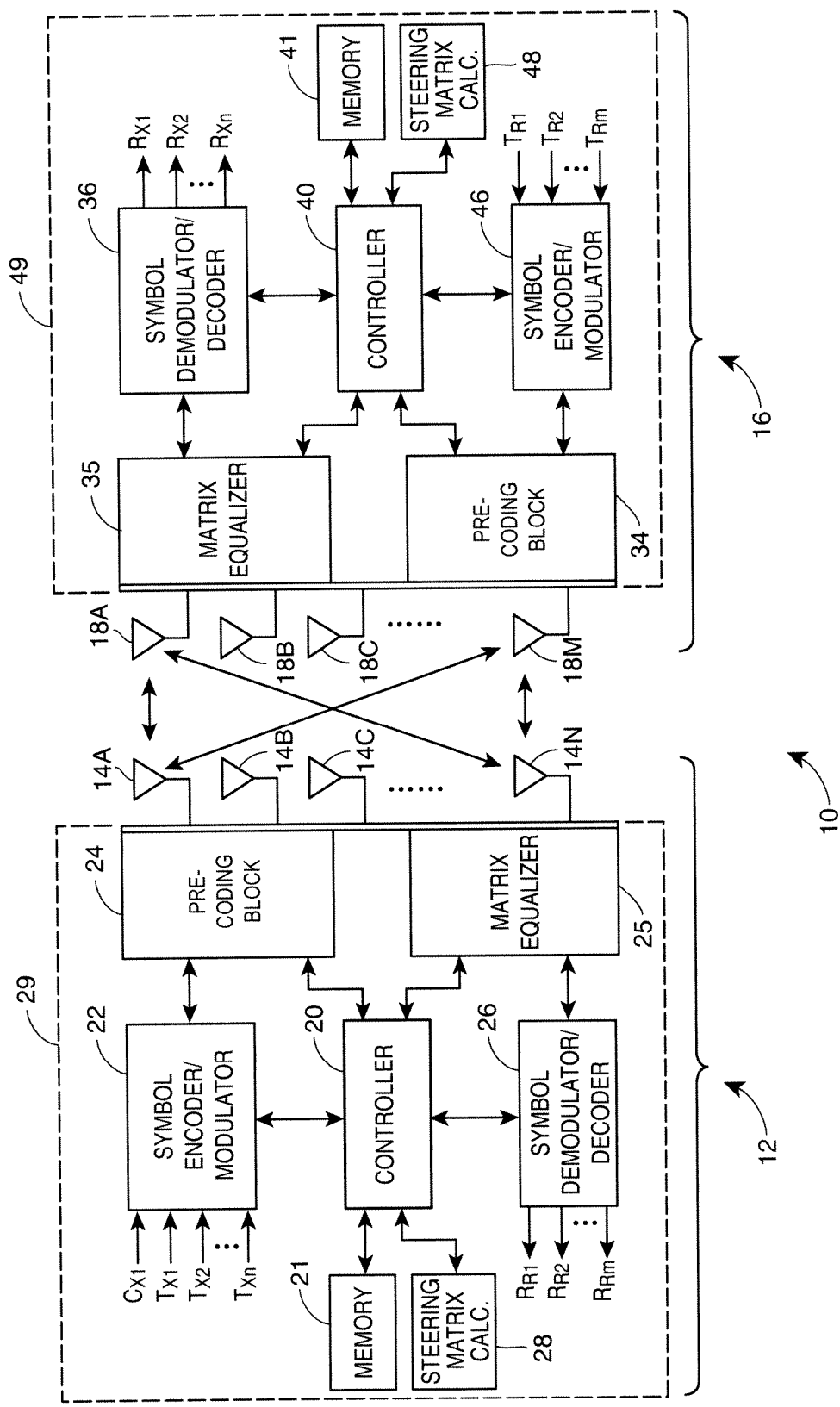
FIG. 1 is a block diagram of a wireless MIMO communication or transmission system that may implement the utilization of channel estimation matrix decomposition for steering matrix calculation and beamforming.

Referring now to FIG. 1, a MIMO communication system 10 is illustrated in block diagram form as generally including a single transmitter 12 having multiple transmitter antennas 14A-14N and a single receiver 16 having multiple receiver antennas 18A-18M. The number of transmitter antennas 14A-14N can be the same as, more than, or less than the number of receiver antennas 18A-18M. As shown in FIG. 1, the transmitter 12 may include a controller 20 coupled to a memory 21, a symbol encoder and modulator unit 22 and a precoding block 24 (the precoding block 24 is also referred to herein as a transmit beamforming network). The transmitter 12 may also include a matrix equalizer 25 and a symbol demodulator and decoder unit 26 to perform demodulation and decoding of signals received via the antennas 14A-14N in a receive mode. Additionally, the transmitter 12 includes a steering matrix calculation unit 28. The controller 12 may be any desired type of controller and both the controller 12 and the steering matrix calculation unit 28 may be implemented as one or more standard multi-purpose, programmable processors, such as micro-processors, as application specific integrated circuits (ASICs), etc., or may be implemented using any other desired types of hardware, software and/or firmware. Likewise, the precoding block 24 or beamforming network, and the matrix equalizer 25 may be implemented using known or standard hardware and/or software elements. If desired, various of the transmitter components, such as the controller 20, the modulator unit 22, the demodulator unit 26, the steering matrix calculation unit 28, the precoding block 24 and the matrix equalizer 25 may be implemented in the same or in different hardware devices, such as in the same or different processors. Additionally, each of these components of the transmitter 12 may be disposed in a housing 29 (shown in dotted relief in FIG. 1). Still further, the routines or instructions for implementing the functionality of any of these components may be stored in the memory 21 or within other memory devices associated with the individual hardware used to implement these components.

During operation, information signals $T_{x1}$-$T_{xn}$ which are to be transmitted from the transmitter 12 to the receiver 16 are provided to the symbol encoder and modulator unit 22 for encoding and modulation. Of course, any desired number of signals $T_{x1}$-$T_{xn}$ may be provided to the modulator unit 22, with this number generally being limited by the modulation scheme used by and the bandwidth associated with the MIMO communication system 10. Additionally, the signals $T_{x1}$-$T_{xn}$ may be any type of signals, including analog or digital signals, and may represent any desired type of data or information. Additionally, if desired, a known test or control signal $C_{x1}$ (which may be stored in the memory 21) may be provided to the symbol encoder and modulator unit 22 for use in determining CSI related information describing the characteristics of the channel(s) between the transmitter 12 and the receiver 16. The same control signal or a different control signal may be used to determine the CSI for each frequency and/or spatial channel used in the MIMO communication system 10. The control signal $C_{x1}$ may be referred to as or included within a sounding packet.

The symbol encoder and modulator unit 22 may interleave digital representations of the various signals $T_{x1}$-$T_{xn}$ and $C_{x1}$ and may perform any other known type(s) of error-correction encoding on the signals $T_{x1}$-$T_{xn}$ and $C_{x1}$ to produce one or more streams of symbols to be modulated and sent from the transmitter 12 to the receiver 16. While the symbols may be modulated using any desired or suitable QAM technique, such as using 64 QAM, these symbols may be modulated in any other known or desired manner including, for example, using any other desired phase and/or frequency modulation techniques. In any event, the modulated symbol streams are provided by the symbol encoder and modulator unit 22 to the precoding block 24 for processing before being transmitted via the antennas 14A-14N. While not specifically shown in FIG. 1, the modulated symbol streams may be up-converted to the RF carrier frequencies associated with an OFDM technique (in one or more stages) before being processed by the precoding block 24 in accordance with a beamforming technique more specifically described herein. Upon receiving the modulated signals, the precoding block 24 or beamforming network processes the modulated signals by injecting delays and/or gains and/or phase rotations into the modulated signals based on a steering matrix (also referred to as a precoding matrix) provided by the controller 20, to thereby perform beamsteering or beamforming via the transmitter antennas 14A-14N.

The signals transmitted by the transmitter 12 are detected by the receiver antennas 18A-18M and may be processed by a matrix equalizer 35 within the receiver 16 to enhance the reception capabilities of the antennas 18A-18M. As will be understood, the processing applied at the receiver 16 (as well as at the transmitter 12) may be based on, for example, the CSI developed by the receiver 16 in response to the transmission of the test or control signal $C_{x1}$ (i.e., sounding packet). In any event, a symbol demodulator and decoder unit 36, under control of a controller 40, may decode and demodulate the received symbol strings as processed by the matrix equalizer 35. In this process, these signals may be downconverted to baseband. Generally, the matrix equalizer 35 and the demodulator and decoder unit 36 may operate to remove effects of the channel based on the CSI as well as to perform demodulation on the received symbols to produce a digital bit stream. In some cases, if desired, the symbol demodulator and decoder unit 36 may perform error correction decoding and deinterleaving on the bit stream to produce the received signals $R_{x1}$-$R_{xn}$ corresponding to the originally transmitted signals $T_{x1}$-$T_{xn}$.

As shown in FIG. 1, the receiver 16 may also include a memory 41 and a symbol encoder and modulator unit 46 which may receive one or more signals $T_{R1}$-$T_{Rm}$ which may be encoded and modulated using any desired encoding and modulation techniques. The receiver 16 may also provide one or more known test or control signals $C_{R1}$ (not shown) to the symbol encoder/modulator unit 46 to be sent to the transmitter 12 to enable the transmitter 12 to determine a measured description of the reverse channel between the receiver 16 and the transmitter 12. The encoded and modulated symbol stream may then be upconverted and processed by a precoding block 34 to perform beamsteering based on a steering matrix developed by a steering matrix calculation unit 48, prior to being transmitted via the receiver antennas 18A-18N to, for example, the transmitter 12, thereby implementing the reverse link. As shown in FIG. 1, each of the receiver components may be disposed in a housing 49.

The matrix equalizer 25 and the demodulator/decoder unit 26 within the transmitter 12 operate similarly to the matrix equalizer 35 and the demodulator/decoder unit 36 of the receiver 16 to demodulate and decode the signals transmitted by the receiver 16 to produce the recovered signals $R_{R1}$-$R_{Rm}$. Here again, the matrix equalizer 25 may process the received signals in any known manner to enhance the separation and therefore the reception of the various signals transmitted by the antennas 18A-18M. Of course, the CSI or other measured description of the forward channel for the various OFDM channel(s) may be used by the steering matrix calculation units 28 and 48 as well as by the controllers 20 and 40 to perform beamforming and to determine a steering matrix used by the precoding blocks 24, 34. As noted above, the CSI, beamforming and other programs and data such as the steering matrix used by the units 28 and 48 and by the controllers 20 and 40 may be stored in the memories 21 and 41.

As is generally known, when the transmitter 12 sends multiple data streams by multiple transmission antennas 14A-14N, or a subset thereof, to multiple receiver antennas 18A-18M, or a subset thereof, of the receiver 16, the data streams are transmitted through a channel matrix, H, which includes the multiple paths between the transmission antennas 14A-14N and the receive antennas 18A-18M. The receiver 16 obtains the signal vectors from the transmission and decodes the signal vectors into the information of interest. As discussed above, in the case of OFDM, the receiver 16 processes OFDM encoded data symbols that include the information of interest. In either case, the receiver 16 uses an estimate of the channel matrix, $\hat{H}$, to resolve each data vector from the data transmission.

The channel estimation matrix, $\hat{H}$, is generated from sounding data transmitted from the transmitter 12. In particular, the transmitter 12 may utilize high throughput, long training fields (HT-LTF), which are periodically generated and transmitted from the transmitter 12 to the receiver 16. Each HT-LTF includes a plurality of training symbols, which are used by the receiver 16 to generate the channel estimation matrix, $\hat{H}$. Generally, the channel estimation matrix is generated at the beginning of a data transmission, such as the beginning of the transmission of a data packet, and reset for subsequent transmissions (e.g., reset for each subsequent data packet). Although HT-LTF generally relates to the IEEE Standard 802.11n standard, it should be understood that other channel estimation preambles or channel estimation training patterns may be utilized in the matrix equalizer reuse techniques described herein, depending on the particular technology involved (e.g., WiMax, DVB-T, DAB, LTE, etc.). The channel estimation matrix is also generally used to develop the steering matrix for beamforming.

As is generally known, beamforming or beamsteering typically includes applying appropriate phases and/or gains and/or phase rotations to the various signals as sent through the multiple transmitter antennas 14A-14N, in a manner which causes the signals sent from the different transmitter antennas 14A-14N to constructively interact (add in phase) in certain predetermined directions and to deconstructively interact (cancel) in other directions. Thus, beamsteering typically produces a beam pattern having high gain regions (referred to as high gain lobes) in various predetermined directions and low gain regions (typically referred to as nulls) in other directions. The use of beamforming techniques in a MIMO system enables a signal to be sent with high gain (as compared to an omni-directional antenna) in certain directions, and to be sent with low gain (as compared to an omni-directional antenna) in other directions. Thus, in the MIMO system 10 of FIG. 1, beamforming may be used to enhance signal directivity towards the receiver antennas 18A-18M, which improves the SNR of the transmissions and results in more reliable transmissions. In this case, the beamforming technique will generally form high gain lobes in the direction of propagation at which the highest gain is desired, and in particular in the directions of propagation from the transmitter 12 to each of the receiver antennas 18A-18M of the receiver 16.

To implement beamforming in the transmitter 12, the steering matrix calculation unit 28 may determine or calculate a set of matrix coefficients (referred to herein as a steering matrix or precoding matrix) which are used by the precoding block or beamforming network 24 to condition the signals being transmitted by the antennas 14A-14N. If desired, the steering matrix for any particular frequency channel of the MIMO system 10 may be determined by the steering matrix calculation unit 28 based on the CSI determined for that channel (wherein the CSI is usually developed by and sent from the receiver 16 but may instead be developed from signals sent from the receiver 16 to the transmitter 12 in the reverse link as an estimate of the forward link).

However, as is known, to actually determine the CSI or other measured description of the forward channel, i.e., for the channel from the transmitter 12 to the receiver 16, the transmitter 12 generally sends a known control or test signal to the receiver 16 (e.g., the signal $C_{x1}$) and the receiver 16 may then determine the CSI or other measured description of the forward channel and send this information back to the transmitter 12 as part of a payload of a transmission, for example as a channel estimation matrix $\hat{H}$. In the event of explicit beamforming, in this case, the transmitter 12 first sends a test or control signal to the receiver 16 which then determines a measured description of the forward channel and sends this description of the forward channel from the receiver 16 back to the transmitter 12. This characterization of the forward channel thereby requires, each time the steering matrix is computed, multiple communications between the transmitter 12 and the receiver 16 so as to enable the transmitter 12 to obtain the CSI or other description of the forward channel used to develop the steering matrix to be used in the forward channel.

Development of the steering matrix can be computationally expensive, and may require feedback (in the form of the CSI, and, more specifically, in the form of a channel estimation matrix $\hat{H}$) from the receiver 16 to the transmitter 12, especially when there are numerous transmitter antennas and receiver antennas. When performing beamforming, it is optimal to develop the steering matrix using various known computational techniques based on the existence of all of the receiver and transmitter antennas. Such a steering matrix generally creates a transmit beam pattern having a high gain lobe directed to some combination of the receiver antennas as determined from, for example, the CSI. However, as the number of receiver and transmitter antennas increases, the required feedback and number of calculations that need to be performed to develop the optimal steering matrix increases significantly (e.g., exponentially).

To reduce the computational load associated with determining the steering matrix, a decomposition technique, such as QR decomposition, may be used in combination with precoding techniques, such as transmit-MRC (maximum ratio combining), singular value decomposition (SVD) or Tomlinson-Harashima Precoding, to develop the steering matrix. For example, QR decomposition of the channel estimation matrix $\hat{H}$ may be utilized to reduce the dimensionality of the matrix used for precoding. In particular, the channel estimation matrix $\hat{H}$ may be decomposed into a unitary Q matrix and an upper triangular R matrix. The channel estimation matrix $\hat{H}$ contains "redundant" information in the form of the Q matrix and "essential" information in the form of the R matrix. The Q matrix represents the coordinate changes of the raw channel matrix H at the beamformee (e.g., receiver 16), where at least one coordinate coincides with one of the vectors in the channel estimation matrix $\hat{H}$. These coordinate changes are largely irrelevant for beamforming purposes. On the other hand, the R matrix represents the stream interference in the channel and is equivalent to the raw channel matrix H. That is, the Q matrix establishes a new coordinate system for the vectors in the channel estimation matrix $\hat{H}$, and the R matrix represents the vectors in relation to the new coordinate system. As such, the R matrix has all the information needed for generating the steering matrix for beamforming, and, as demonstrated further below, only the R matrix need be fed back to the beamformer (e.g., transmitter 12). In addition, the steering matrix need only be calculated based on the R matrix, which may be calculated at the beamformee and fed back to the beamformer. However, because the R matrix is an upper triangular matrix with zero values in the lower-diagonal elements, the number of real and complex values of the R matrix are fewer than the number of elements in the channel estimation matrix $\hat{H}$, and the complexity of the calculations and the amount of feedback is reduced as compared with the channel estimation matrix $\hat{H}$.

Figure 2A:
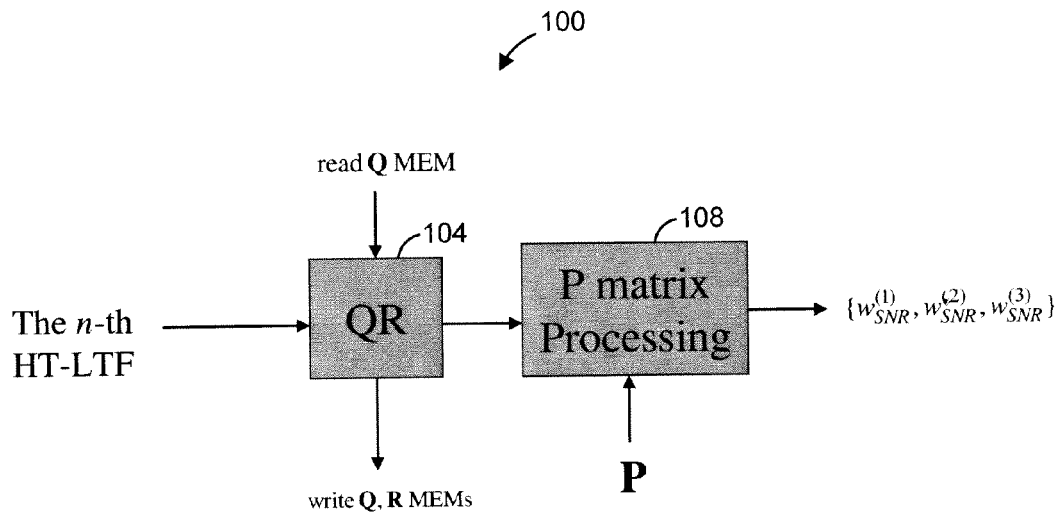
FIG. 2A is a block diagram of an example matrix equalizer computational block.

Referring now to FIG. 2A, an example matrix equalizer computational block 100 will now be described. The block 100 may be included in the matrix equalizer 35 of FIG. 1, for example. As will be described subsequently, the block 100 may be reused for calculations related to equalization matrix computation.

In FIG. 2A, the block 100 is illustrated in the context of processing a high throughput, long training field (HT-LTF). In systems compliant with the IEEE 802.11n Standard, HT-LTFs are periodically generated and transmitted by a transmitter. Each HT-LTF includes a plurality of training symbols. At the transmitter, each training symbol is multiplied by a corresponding column of a preamble steering matrix P, wherein a number of rows of the matrix P corresponds to the number of spatial streams, and a number of columns of the matrix P corresponds to the number of HT-LTFs. Matrix P is configured to improve the orthogonality of the training symbols as they are transmitted from the antennas of the transmitter.

A receiver knows what training symbols were transmitted in the HT-LTFs and also knows the matrix P. After receiving all of the HT-LTFs, the receiver generates a channel estimation matrix $\hat{H}$ based on the known training symbols, the matrix P, and the received training symbols. The matrix $\hat{H}$ can then be used to adjust matrix equalizer coefficients. The block 100 can be used by a receiver to process HT-LTFs for updating equalizer coefficients. Also, the block 100 can be used to apply an equalizer matrix to received data.

Figure 2B:
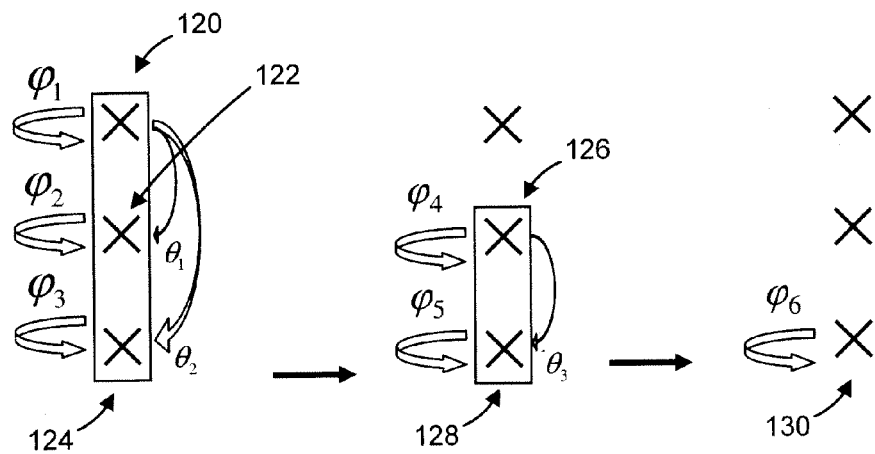
FIG. 2B is an illustration of an iterative algorithm for decomposing a 3×3 matrix into Q and R matrices.

The block 100 includes a QR decomposition processor 104, which is coupled to a Q memory and an R memory (not shown). Generally speaking, QR decomposition is a method in which a matrix is decomposed into a Q matrix multiplied by an R matrix, wherein the Q matrix is a unitary (orthonormal) 1 matrix (i.e., $Q^H Q = I$) (wherein the Hermitian operator$^H$ stands for transpose conjugate) and R is an upper triangular matrix. The QR decomposition processor 104 iteratively decomposes an input matrix. For example, the QR decomposition processor 104 may implement a Householder reflections algorithm, a Givens rotations algorithm, etc., to iteratively decompose an input matrix into Q and R matrices. In one embodiment, the QR decomposition processor 104 implements an algorithm that will be described with reference to FIG. 2B. In particular, FIG. 2B illustrates an iterative algorithm for decomposing a 3×3 matrix into Q and R matrices. Those of ordinary skill in the art will recognize that the algorithm to be described with reference to FIG. 2B can be straightforwardly modified for use with decomposing other size matrices.

In FIG. 2B, the matrix to be decomposed is represented by a 3×3 array of X's. First, a matrix $Q_{\phi_1}$ is determined such that multiplying it by the original matrix will cause the complex element 120 to become a real number. This process may be considered as rotating the complex element 120 by an angle $\phi_1$. The matrix $Q_{\phi_1}$ may be stored in a Q memory, and the resultant matrix ($R_1$), i.e., the original matrix after element 120 has been rotated by $\phi_1$, may be stored in an R memory. Optionally, the angle $\phi_1$ may be stored in the Q memory, rather than the matrix $Q_{\phi_1}$. Optionally, the $R_1$ matrix may be kept in a temporary storage, rather than being stored in the R memory. Similarly, a matrix $Q_{\phi_2}$ is determined such that $Q_{\phi_2} R_1$ will cause the complex element 122 to become a real number. This process may be considered as rotating the complex element 122 by an angle $\phi_2$. The multiplication result $Q_{\phi_2} Q_{\phi_1}$ may be stored in the Q memory such that $Q_{\phi_1}$ is overwritten, and the resultant matrix ($R_2$) is stored in the R memory such that $R_1$ is overwritten. Optionally, the angle $\phi_2$ may be stored in the Q memory, rather than the matrix $Q_{\phi_2} Q_{\phi_1}$. Optionally, the $R_2$ matrix may overwrite the $R_1$ matrix in temporary storage. Then, a matrix $Q_{\phi_3}$ is determined such that $Q_{\phi_3} R_2$ will cause the complex element 124 to become a real number. This process may be considered as rotating the complex element 124 by an angle $\phi_3$. The multiplication result $Q_{\phi_3} Q_{\phi_2} Q_{\phi_1}$ may be stored in the Q memory such that $Q_{\phi_2} Q_{\phi_1}$ is overwritten, and the resultant matrix ($R_3$) is stored in the R memory such that $R_2$ is overwritten. Optionally, the angle $\phi_3$ may be stored in the Q memory, rather than the matrix $Q_{\phi_3} Q_{\phi_2} Q_{\phi_1}$. Optionally, the $R_3$ matrix may overwrite the $R_2$ matrix in temporary storage.

Next, a matrix $Q_{\theta_1}$ is determined such that $Q_{\theta_1} R_3$ the vector including elements 120 and 122 is rotated by an angle $\theta_1$ that causes the element 122 to go to zero. The multiplication result $Q_{\theta_1} Q_{\phi_3} Q_{\phi_2} Q_{\phi_1}$ may be stored in the Q memory such that $Q_{\phi_3} Q_{\phi_2} Q_{\phi_1}$ is overwritten, and the resultant matrix ($R_4$) is stored in the R memory such that $R_3$ is overwritten. Optionally, the angle $\theta_1$ may be stored in the Q memory, rather than the matrix $Q_{\theta_1} Q_{\phi_3} Q_{\phi_2} Q_{\phi_1}$. Optionally, the $R_4$ matrix may overwrite the $R_3$ matrix in temporary storage. Similarly, a matrix $Q_5$ is determined such that $Q_{\theta_2} R_4$ the vector including elements 120 and 124 is rotated by an angle $\theta_2$ that causes the element 124 to go to zero. The multiplication result $Q_{\theta_2} Q_{\theta_1} Q_{\phi_3} Q_{\phi_2} Q_{\phi_1}$ may be stored in the Q memory such that $Q_{\theta_1} Q_{\phi_3} Q_{\phi_2} Q_{\phi_1}$ is overwritten, and the resultant matrix ($R_5$) is stored in the R memory such that $R_3$ is overwritten. Optionally, the angle $\theta_2$ may be stored in the Q memory, rather than the matrix $Q_{\theta_2} Q_{\theta_1} Q_{\phi_3} Q_{\phi_2} Q_{\phi_1}$. Optionally, the $R_5$ matrix may overwrite the $R_4$ matrix in temporary storage.

In subsequent iterations, the elements are rotated in the same manner as above. In addition, element 126 is rotated by an angle $\phi_4$, and element 128 is rotated by angle $\phi_5$. Then, the vector including elements 126 and 128 is rotated by an angle $\theta_3$ that causes the element 128 to go to zero. Finally, the element 130 rotated by an angle $\theta_6$. After rotating element 130 by the angle $\phi_6$, the Q memory may be updated and thus contains the Hermitian of the Q matrix (i.e., $Q^H$) corresponding to the QR decomposition and/or the angles $\phi_1$-$\phi_6$ and $\theta_1$-$\theta_3$. Also, the resultant matrix may be stored in the R memory and the R memory will thus contain the R matrix corresponding to the QR decomposition.

Referring again to FIG. 2A, the QR decomposition processor 104 may implement the algorithm described with reference to FIG. 2B. The QR decomposition processor 104 may receive a matrix corresponding to each tone, each tone in turn corresponding to each HT-LTF received by the receiver. In particular, each matrix may include rows and columns that correspond to a number of training symbols received by a number of receiver antennas.

The QR decomposition processor 104 may be coupled to a P matrix processing block 108 that generates a plurality of substream signal-to-noise (SNR) values ($W_{SNR}^{(1)}$, $W_{SNR}^{(2)}$), corresponding to the substream SNRs of the 1$^{st}$ and 2$^{nd}$ spatial streams respectively, based on the R matrix and the P matrix. Each of the substream SNR values may correspond to one of the spatial streams. The substream SNR values may be utilized for soft decoding at the demodulator and decoder unit 36 of FIG. 1, and/or for modulation and coding scheme (MCS) selection. As defined in the IEEE 802.11n specification, matrix P is configured as a real orthogonal matrix, for the purpose of orthogonality between the training symbols as they are transmitted from the antennas of the transmitter. With the P matrix applied, the un-processed CSI estimate corresponding to the k-th subcarrier of the MIMO-OFDM system, before feeding into the QR decomposition processor 104 of FIG. 2A, is an estimate of the matrix $H_{raw\_k} = H_k Q_{k,sounding} P$. So the QR decomposition processor 104 basically computes the QR decomposition of the matrix $H_{raw\_k}$, and the P matrix processing block 108 adjusts the QR decomposition to account for the P matrix, thereby deriving the corrected Q and R matrices (as well as the substream-SNR values) of the true channel $H_k Q_{k,sounding} = H_{raw\_k} P^{-1}$.

Using QR decomposition, such as that described above, it can be seen that the channel estimation matrix $\hat{H}$ may be decomposed into a Q matrix and an R matrix. In particular, the QR decomposition selects a new coordinate system for the channel estimation matrix $\hat{H}$, and describes the vectors of the channel estimation matrix $\hat{H}$ along the axes of the new coordinate system (i.e., new values along the axes). The new coordinates are described by the Q matrix, such that the Q matrix represents the coordinate change at the receiver. The R matrix represents coordinate values along the new coordinates described by the Q matrix. For beamforming purposes, the R matrix is considered equivalent to the raw channel estimate $\hat{H}$. Instead of using all vectors in the channel estimation matrix $\hat{H}$ (e.g., $h_1$, $h_2$, $h_3$, ...), where each vector is described by a set of coordinates, the R matrix preserves the relationship between the vectors, and it is the relationship between the vectors that is used for calculating the steering matrix and for beamforming. As such, it is not necessary to feed back the coordinates to the beamformer or otherwise use the coordinates for calculating the steering matrix.

In addition, the R matrix reduces the number of elements by virtue of being an upper triangular matrix. That is, an upper triangular matrix has real numbers as the diagonal elements, complex numbers as the upper-diagonal elements, and zeros as the lower-diagonal elements. Not all of the elements of the R matrix need be fed back to the beamformer; only the diagonal and upper-diagonal element values are fed back as the R matrix may be readily reconstructed (or only the diagonal and upper-diagonal elements are utilized) to calculate the steering matrix. Accordingly, calculations based on the R matrix results in lower computational complexity and hardware cost, as compared to calculations based on the channel estimation matrix $\hat{H}$, and further results in a lower amount of feedback to the beamformer as compared to the channel estimation matrix $\hat{H}$.

As suggested above, at least the diagonal and upper-diagonal elements of the R matrix resulting from the QR decomposition of the channel estimation matrix $\hat{H}$ may be fed back to the beamformer. The steering matrix calculation unit of the beamformer (such as the steering matrix calculation unit 28 of the transmitter) may then use these elements to perform precoding or other techniques for determining a steering matrix based on the R matrix. These techniques include, for example, transmit-MRC (maximum ratio combining), singular value decomposition (SVD) and Tomlinson-Harashima Precoding (THP). The R matrix elements may be fed back using various methods that are known to those of ordinary skill in the art, including, but not limited to, analog feedback and quantized feedback. Analog feedback transmits each element without quantization using analog communication. The analog feedback method directly modulates the carrier with the matrix values. While there is a greater chance of error (noise, interference), there is no quantization error. Quantized feedback, on the other hand, must account for quantization error. Quantized feedback quantizes each element being transmitted by mapping or approximating the values to the nearest quantized coefficient (i.e., derive quantization bits representing the elements of the R matrix), encodes the quantized coefficients with error correcting codes and feeds back the quantized coefficients encoded with the error correcting codes to the beamformer using digital communications. As quantization techniques are generally well known by those of ordinary skill in the art, they will not be discussed in further detail herein.

As an alternative to R matrix feedback, the steering matrix calculation unit of the beamformee (such as the steering matrix calculation unit 48 of the receiver) may use the R matrix to perform precoding or other techniques to determine a steering matrix. The resulting steering matrix may then be fed back to the beamformee.

Precoding the R matrix is similar to the precoding of the channel estimation matrix $\hat{H}$ that is already performed. For example, a singular value decomposition (SVD) method or any other method or technique which determines a set of right singular matrixes that accurately describes or defines the forward channel and another set of right singular matrixes that accurately describes or defines the estimate of the forward channel $\hat{H}$ may be utilized. This determination can be expressed mathematically as:

$$\hat{H}=U\Sigma V^H, \quad \text{(Equ. 1)}$$

where U is the left singular matrix for the channel estimation matrix $\hat{H}$; and V is the right singular matrix which defines the forward channel determined using, for example, an SVD technique. The superscript $^H$ in Equation 1 above denotes the conjugate transpose of the associated matrix while the $\Sigma$ function in these equations denotes the diagonal singular value matrix.

With $UV^H$ being a unitary matrix describing coordinate of the channel estimation matrix $\hat{H}$, but not all coordinates, the steering matrix calculation unit 28, 48 multiplies the V matrix with x, where x is the signal to be transmitted. That is:

$$\hat{H}(Vx)=(\hat{H}V)x=(U\Sigma)x \quad \text{(Equ. 2)}$$

Matrix V may then be used as the steering or precoding matrix:

$$U^H y=\Sigma x \quad \text{(Equ. 3)}$$

With the $\Sigma$ function being the diagonal singular value matrix, there is no stream interference.

By performing precoding on the R matrix to derive the steering matrix, the complexity may be decreased as compared to precoding on the channel estimation matrix $\hat{H}$. However, it is noted that QR decomposition remains less complex than precoding. At a minimum, any increase in computational complexity due to the QR decomposition is minimal. Accordingly, while it is contemplated that the beamformee conducts the QR decomposition, whether the beamformee or beamformer conducts the precoding on the R matrix may depend on the processing capabilities of the beamformee and beamformer. For example, if the beamformer is a wireless base station and the beamformee is a wireless mobile station, the beamformer may generally have greater processing capabilities and therefore conducts the precoding based on the feedback of R matrix elements from the beamformee, which conducted the QR decomposition.

Another consideration is the accuracy of the steering matrix. By having the beamformee develop the steering matrix, the steering matrix may be more accurate than that developed by the beamformer, due to the possibility of channel interference affecting the values of the R matrix elements or other corruption of the feedback. Nonetheless, it is contemplated that the beamformee, rather than the beamformer, conducts the QR decomposition on the channel estimation matrix.

Here, it is useful to note that the matrix equalizer (of the receiver 16 for example) acts on the estimate of the channel CSI to determine matrix coefficients that help equalize (separate) the (multiple) transmitted signals. A matrix equalizer is an essential component of any MIMO communication system, and is needed for a receiver to recover the transmitted signals. Thus, the computational mechanisms used to perform matrix equalization are needed within the receiver hardware components of a MIMO communication system. However, beamforming is an optional technique, and thus any structure added to perform beamforming adds to the cost and computational load of the hardware/software components of the MIMO communication system. However, because both matrix equalization and beamforming are essentially matrix operations, some of the computing structure provided to implement matrix equalization optionally may be used to implement or perform beamforming or beamsteering operations, thereby enabling both of these operations to be performed using common hardware/software or other computational mechanisms.

For example, the matrix equalizer often uses a QR decomposition algorithm to determine the equalizer coefficients and signal-to-noise ratio (SNR) values (as described above) and feed back these SNR values to the transmitter 12. This QR decomposition algorithm may be reused to perform beamforming computations.

In the SNR example, vectors of the channel estimation matrix $\hat{H}$ includes both an interference component and a signal component, and the SNR values relate to the ratio of the signal component to the interference component. The SNR values are used by the beamformer to modulate and code the signal to accommodate channel interference. If channel interference is low, the beamformer may use a higher rate of modulation and coding. If the channel interference is high, the beamformer may use a lower rate. However, the SNR calculations may be complex using the channel estimation matrix $\hat{H}$ itself. On the other hand, QR decomposition of the channel estimation matrix $\hat{H}$ provides a Q matrix that establishes a new coordinate system for the vectors of the channel estimation matrix $\hat{H}$ with at least one coordinate coinciding with one of the vectors of the channel estimation matrix $\hat{H}$. The R matrix represents the vectors of the channel estimation matrix $\hat{H}$, in relation to the new coordinate system. Determining the SNR values has been found to be much easier when based on the R matrix than on the channel estimation matrix $\hat{H}$. Since QR decomposition of the channel estimation matrix $\hat{H}$ is sometimes performed for other operations, such as SNR value calculation, the results of this QR decomposition may also be utilized for the disclosed technique of using the R matrix, of a subset of elements thereof, to calculate a steering matrix and perform beamforming.

Thus, based on the discussion provided above, it is optional to use the computational structure of a matrix equalizer within a MIMO communication system to perform at least some aspects of the transmit beamforming or beamsteering operations. In this case, the decomposition operations using matrix equalizer structure can be performed in a receiver of the transmitter/receiver pair in which transmit beamforming is to be used in sending signals from the transmitter to the receiver of the transmitter/receiver pair. Optionally, the steering matrix calculation unit 28 or 48 may use some of the computational structure of the associated matrix equalizer 25 or 35 to compute a precoding (steering) matrix. In the case in which the matrix equalizer 35 of the receiver 16 is used to perform calculations for explicit transmit beamforming within the transmitter 12, the processing using the matrix equalizer 35 is performed in the receiver 16 to determine and decompose the channel estimation matrix to develop the R matrix, and, optionally, to develop the steering matrix itself, and the diagonal and upper-diagonal elements of the R matrix or the steering matrix itself may be sent to the transmitter 12.

In any event, as discussed above, the matrix equalizer 35 (of the receiver 16) and/or the matrix equalizer 25 (of the transmitter 12) optionally may be used to perform beamforming calculations for performing transmit beamforming between the transmitter 12 and the receiver 16. If the matrix equalizer 35 of the receiver 16 is used to perform these beamforming calculations, the steering matrix calculation unit 48 may, for example, use the structure of the matrix equalizer 35 to develop appropriate intermediate information needed for determining the transmit steering matrix such as QR decomposition information (e.g., diagonal and upper-diagonal elements of the R matrix), CORDIC rotations, etc. The steering matrix calculation unit 48 may then send this intermediate information to the transmitter 12 for use by the steering matrix calculation unit 28 in forming the transmit steering matrix. On the other hand, if desired, the steering matrix calculation unit 48 may actually the transmit steering matrix from the intermediate information developed using the matrix equalizer 35 and send this steering matrix to the transmitter 12. Alternatively, if the matrix equalizer 25 of the transmitter 12 is used to perform beamforming calculations, the steering matrix calculation unit 28 of the transmitter 12 may use the structure or algorithms of the matrix equalizer 25 to develop the transmit steering matrix from intermediate information fed back from the receiver 16. The steering matrix calculation units 28 and 48 may reuse as much of the components and structure of the matrix equalizers 25 and/or 35 as possible or desired in computing the transmit steering matrix for use by the transmitter 12. It is to be understood, however, that reuse of the components and structure of the matrix equalizers 25 or 35 for transmit beamforming are optional. Thus, in some embodiments, the matrix equalizers 25 or 35 may not be utilized for performing any beamforming computations.

Using computational resources of a matrix equalizer to determine the steering matrix used by a transmitter to perform beamforming in the transmission of a signal to the receiver may reduce the circuitry and/or software for forming the steering matrix, may reduce the complexity of the hardware and/or the software used to implement the transmitter and/or the receiver and may also increase the speed at which the transmitter is able to transmit information or adapt to new channel conditions based on the receipt of new or updated CSI.

Figure 3:
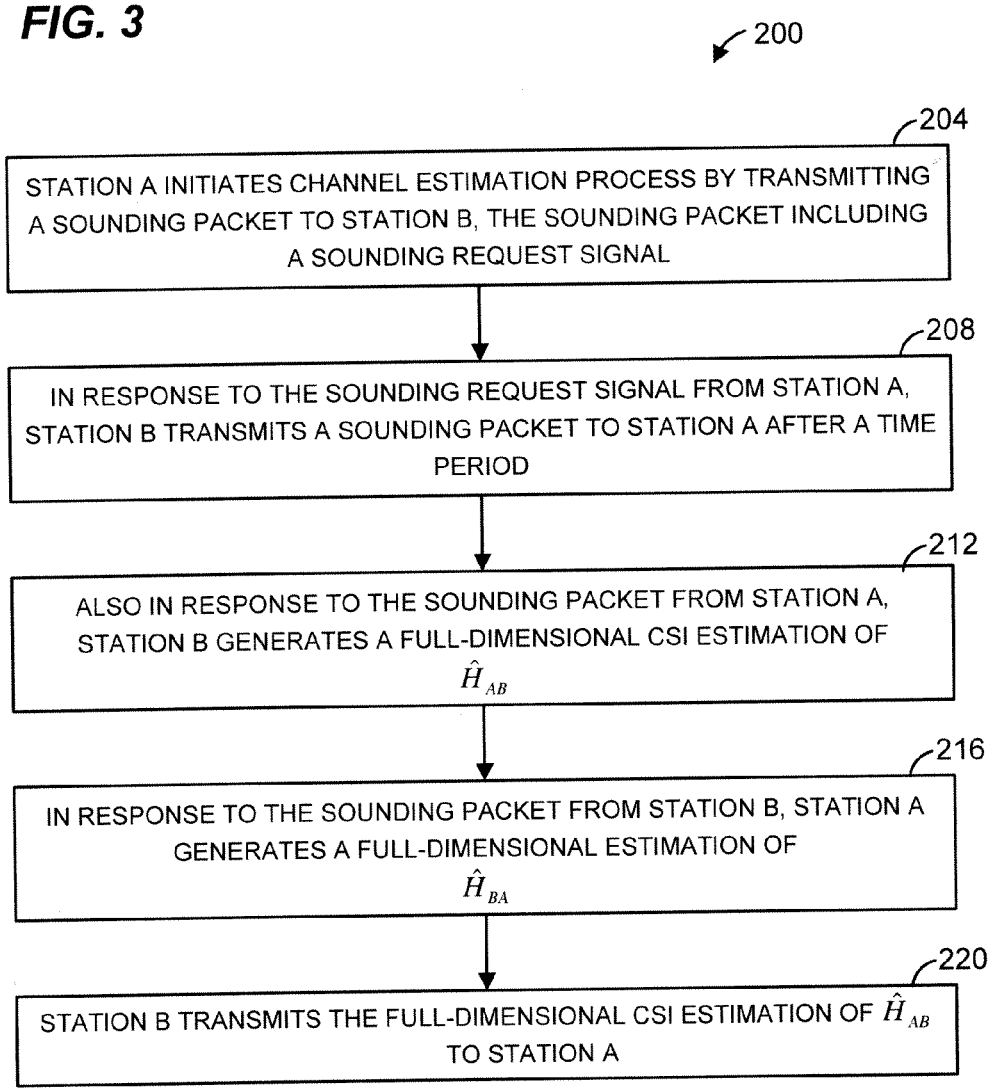
FIG. 3 is a flow diagram of a prior art method for determining forward and reverse channels in a wireless network.
Figure 4:
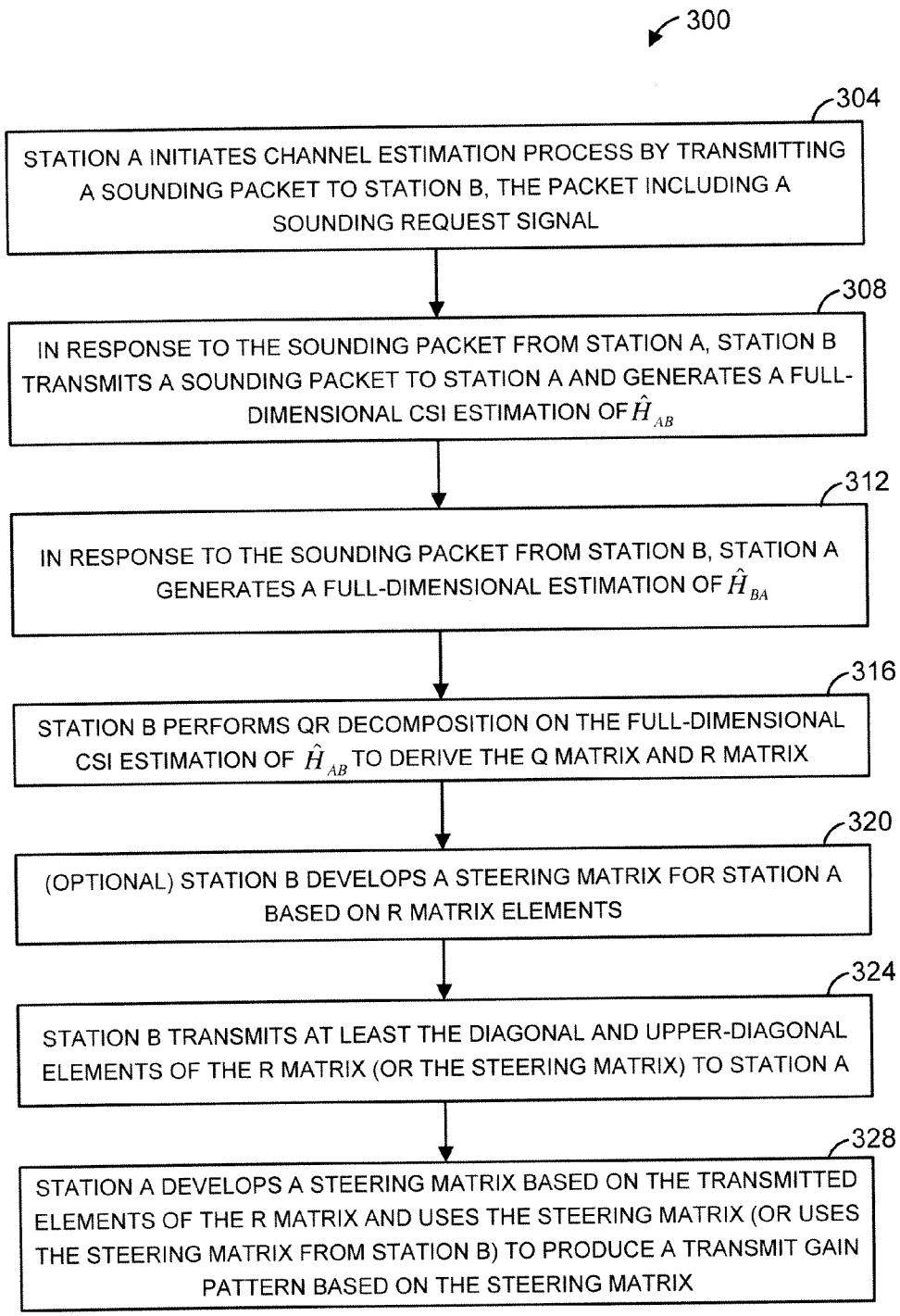
FIG. 4 is a flow diagram of an example method for determining forward and reverse channels and determining a steering matrix and beamforming from a QR decomposition of the forward channel estimate in a wireless network.

FIGS. 3 and 4 are described below with reference to explicit beamforming using sounding packets and data packets. FIG. 3 is a flow diagram of a prior art method 200 for determining the forward channel estimate at a transmitting station in a wireless network. At a block 204, Station A initiates an estimation process by sending a sounding packet to Station B. A sounding packet is a physical layer packet in a packet switched wireless network that contains training information for all available spatial dimensions of a multiple-antenna channel. The sounding packet sent at the block 204 includes a "sounding request" signal, which indicates to Station B that Station A is requesting that Station B transmit a sounding packet to Station A.

At a block 208, in response to receiving the sounding packet with the sounding request signal, Station B transmits a sounding packet after a time period, which is defined by the wireless network requirement, and in general should be short. For example, in draft IEEE 802.11n WLANs, the time period is 16 microseconds, and is referred to as the short inter-frame space (SIFS). At a block 212, also in response to receiving the sounding packet with the sounding request signal, Station B generates a full-dimensional channel state information (CSI) estimation of the forward channel $\hat{H}_{AB}$.

At a block 216, in response to receiving the sounding packet from Station B. Station A generates an estimate of the full-dimensional reverse channel $\hat{H}_{BA}$ based on the training information in the sounding packet. At a block 220, after Station B generates the full-dimensional CSI estimation $\hat{H}_{AB}$. Station B transmits it back to Station A via a CSI feedback packet. According to many wireless network protocols, transmission of the CSI feedback packet typically is not considered time critical.

In the prior art method 200, generation of the sounding packet by Station B is a relatively time-critical task because the sounding packet should be transmitted after a relatively short time period. Thus, complex/expensive hardware in Station B is required so that the sounding packet can be generated quickly. Additionally, a single sounding packet includes enough information for calibrating every receiver chain of the Station A. Because the sounding packet will be received by multiple receiver chains of the Station A, the sounding packet includes more information than is necessary for Station A.

FIG. 4 is a flow diagram of an example method 300 for beamforming based on R matrix elements from a QR decomposition of the channel estimation matrix, as performed in a station in a wireless network. Although the following example demonstrates this beamforming technique with respect to the forward channel, where Station A acts as the beamformer and Station B acts as the beamformee, it should also be recognized that this beamforming technique may be conducted with respect to the reverse channel, where Station A acts as the beamformee and generates a full-dimensional estimation of the reverse channel (as noted below), whereas Station B acts as the beamformer.

At a block 304, Station A initiates a channel estimation process by sending a sounding packet to Station B. The sounding packet is the same or similar to the sounding packet of FIG. 3. The sounding packet sent at the block 304 includes a "sounding request" signal, which indicates to Station B that Station A is requesting that Station B transmit a sounding packet to Station A.

At a block 308, in response to receiving the sounding packet with the sounding request signal, Station B transmits a sounding packet after a time period as above in FIG. 3. Also at a block 308, Station B generates a full-dimensional channel state information (CSI) estimation $\hat{H}_{AB}$. At a block 312, in response to receiving the sounding packet from Station B, Station A generates an estimate of the full-dimensional reverse channel $\hat{H}_{BA}$ based on the training information in the sounding packet. At a block 316, Station B performs a QR decomposition on the full-dimensional channel estimation matrix $\hat{H}_{AB}$ to derive the Q matrix and the R matrix. Optionally, at block 320, Station B develops a steering matrix based on the R matrix, for example by using transmit-MRC (maximum ratio combining), singular value decomposition (SVD) and Tomlinson-Harashima Precoding (THP).

In addition to performing QR decomposition at block 316, the beamformee may also normalize the resulting R matrix. For example, while only the R matrix may be relevant for beamforming purposes, the relevancy may be defined even further. Specifically, only the relative values among the elements of the R matrix are relevant, and knowledge of the absolute values of the R matrix is not necessary for calculating the steering matrix. Accordingly, the matrix elements of the R matrix may be normalized by the matrix element in the first row and first column of the R matrix (i.e., $R_{1,1}$). The (1, 1)-th element of the normalized R matrix does not need to be fed back to the beamformee (if R matrix elements are being fed back), because the (1, 1)-th element is normalized by itself to 1. As such, the feedback to the beamformee may be further reduced.

However, in the event of beamforming with adaptive modulation, the R matrix may be normalized by the standard deviation of the noise, such as the standard deviation of the SNR values or noise power, for example. In this case, at a minimum, all the normalized diagonal elements and upper-diagonal elements of the R matrix are fed back to the beamformee. As such, any need to send back noise variance information (such as the SNR values) is obviated. Alternatively, the R matrix may be normalized with the (1, 1)-th element, as above, and the noise variance may be fed back separately. As beamforming with adaptive modulation is generally well known by those of ordinary skill in the art, it will not be discussed in further detail herein.

At a block 324, Station B transmits either the full R matrix, or just the diagonal and upper-diagonal elements of the R matrix (the lower-diagonal elements being zeros), back to Station A via a feedback packet. If Station B developed the steering matrix at block 320, Station B transmits the steering matrix to Station A via the feedback packet. Station A, at a block 328, develops a steering matrix based on the transmission of the R matrix, for example by using transmit-MRC (maximum ratio combining), singular value decomposition (SVD) and Tomlinson-Harashima Precoding (THP). If just the diagonal and upper-diagonal elements of the R matrix were transmitted in the feedback packet, Station A may readily reconstruct the R matrix, given that the lower-diagonal elements are zeros, and develop the steering matrix. Station A may use the steering matrix developed from the R matrix (either by Station A or as transmitted from Station B) to produce a transmit gain pattern for signal transmission in the forward channel to Station B.

The following are examples of R matrices and R matrix elements that are fed back to the beamformer, and an explanation as to how these examples compare with full-dimensional channel estimation feedback. As is known, transmission from the transmitter 12 (Station A) to the receiver 16 (Station B) in the forward channel can be modeled as:

$$y_B = H_{AB} x_A + n_B \qquad \text{(Equ. 4)}$$

where $y_B$ and $n_B$ are the received signal vector and additive noise vector at Station B, respectively; and $H_{AB}$ is the equivalent effective channel matrix from Station A to Station B; $x_q$ is the transmit signal vector to be transmitted from Station A. Where Station A has M transmit antennas and Station B has N receive antennas, each of the received signal vector, additive noise vector, channel matrix and transmit signal may be respectively expressed as a column vector of N×1:

$$y_B \in C^{N \times 1} \qquad \text{(Equ. 5)}$$

$$n_B \in C^{N \times 1} \qquad \text{(Equ. 6)}$$

$$H_{AB} \in C^{N \times M} \qquad \text{(Equ. 7)}$$

$$x_A \in C^{M \times 1} \qquad \text{(Equ. 8)}$$

Under the R matrix-based beamforming techniques, when N=M (i.e., the number of receive and transmits antennas are equal, and $\hat{H}_{AB}$ is a square matrix), the R matrix may be expressed as:

$$R = \begin{bmatrix} r_{1,1} & r_{1,2} & \cdots & r_{1,M} \\ 0 & r_{2,2} & \cdots & r_{2,M} \\ \vdots & \vdots & \ddots & \vdots \\ 0 & 0 & \cdots & r_{M,M} \end{bmatrix} \in C^{M \times M} \qquad \text{(Equ. 9)}$$

From the above, it can be seen that the number of upper diagonal elements is equal to $$\frac{M(M-1)}{2}$$

complex numbers. The number of diagonal elements is equal to M real numbers. Accordingly, the total number of real values to feed back to the beamformer is $M^2$.

When N>M (i.e., there are more receive antennas than transmit antennas), the R matrix may be expressed as:

$$R = \begin{bmatrix} r_{1,1} & r_{1,2} & \cdots & r_{1,M} \\ 0 & r_{2,2} & \cdots & r_{2,M} \\ \vdots & \vdots & \ddots & \vdots \\ 0 & 0 & \cdots & r_{M,M} \end{bmatrix} \in C^{M \times M} \qquad \text{(Equ. 10)}$$

From the above, it can be seen that the R matrix is still square, as the M columns of $\hat{H}_{AB}$ can be represented by M coordinates in the R matrix, assuming that during QR decomposition the new coordinates (e.g., coordinates coinciding with at least one vector of $\hat{H}_{AB}$) were chosen appropriately so as to represent all of $\hat{H}_{AB}$ with M columns. Again, the number of upper diagonal elements is equal to $$\frac{M(M-1)}{2}$$

complex numbers, and the number of diagonal elements is equal to M real numbers, such that the total number of real values to feed back to the beamformer is $M^2$.

When N<M (i.e., there are fewer receive antennas than transmit antennas), the R matrix may be expressed as:

$$R = \begin{bmatrix} r_{1,1} & r_{1,2} & \cdots & r_{1,N} & \cdots & r_{1,M} \\ 0 & r_{2,2} & \cdots & r_{2,N} & \cdots & r_{2,M} \\ \vdots & \vdots & \ddots & \ddots & \ddots & \vdots \\ 0 & 0 & \cdots & r_{N,N} & \cdots & r_{N,M} \end{bmatrix} \in C^{N \times M} \qquad \text{(Equ. 11)}$$

From the above, it can be seen that the R matrix is the same size as $\hat{H}_{AB}$, due to N coordinates being used to represent all vectors of $\hat{H}_{AB}$ (the Q matrix spans all N dimensions). However, because the lower-diagonal elements of the R matrix are zeros, there remain fewer matrix elements to feed back to the beamformer. Specifically, the number of upper diagonal elements is equal to $$\frac{MN - N(N+1)}{2}$$

complex numbers, and the number of diagonal elements is equal to N real numbers, such that the total number of real values to feed back to the beamformee is (2M−N)N.

The following table provides a comparison of the feedback amount for the R matrix (diagonal and upper-diagonal elements) versus the feedback amount for the channel estimation matrix $\hat{H}_{AB}$:

| Antenna Configuration | Number of Real Values Required for Feedback | | Feedback Reduction with R Matrix Based on | Example Configuration |
|---|---|---|---|---|
| | R Matrix | Channel Estimation Matrix | Reduction with R Matrix | |
| N = M | $M^2$ | $2M^2$ | $\frac{M^2}{2M^2} = \frac{1}{2}$ | 50% |
| N > M<br>N = 4, M = 2 | $M^2$ | 2 MN | $\frac{M^2}{2MN} = \frac{M}{2N}$ | 75% |
| N < M<br>N = 2, M = 4 | (2M − N)N | 2 MN | $\frac{(2M-N)N}{2MN} = \frac{1-N}{2M}$ | 25% |

Although the performance difference between using the R matrix or the channel estimation matrix $\hat{H}_{AB}$ may be the same and the probability of beamformee error on each is the same, there is still a significant reduction in the feedback when considering the bandwidth allotted for feedback. It is also noted that while each element of the R matrix may have, on average, more information than an element of the channel estimation matrix $\hat{H}_{AB}$, because each real number may have a large dynamic range, the number of elements is still reduced, thereby reducing the overall feedback. For example, each element of the channel estimation matrix $\hat{H}_{AB}$ require 10 bits in the feedback, and each element of the R matrix may require 11 bits, but there may only be 5 elements from the R matrix as compared with 10 elements from the channel estimation matrix $\hat{H}_{AB}$. Thus, the feedback comparison is 55 bits for the R matrix as compared to 100 bits for the channel estimation matrix $\hat{H}_{AB}$.

The following table provides a comparison of the feedback amount for the R matrix versus the feedback amount for a steering matrix V developed by the beamformee from the channel estimation matrix $\hat{H}_{AB}$:

| Antenna Configuration | Number of Real Values Required for Feedback | | Feedback Reduction with R Matrix Based on | Example Configuration |
|---|---|---|---|---|
| | R Matrix | Matrix V (if using SVD) | Reduction with R Matrix | |
| N = M | $M^2$ | $2M^2$ | $\frac{M^2}{2M^2} = \frac{1}{2}$ | 50% |
| N > M<br>N = 4,<br>M = 2 | $M^2$ | $2M^2$ | $\frac{M^2}{2M^2} = \frac{1}{2}$ | 50% |
| N < M<br>N = 2,<br>M = 4 | (2M − N)N | 2 MN | $\frac{(2M-N)N}{2MN} = \frac{1-N}{2M}$ | 25% |

Again, there is a significant reduction in the feedback when transmitting the R matrix feedback as compared to transmitting the steering matrix developed using the channel estimation matrix $\hat{H}_{AB}$.

Figure 5:
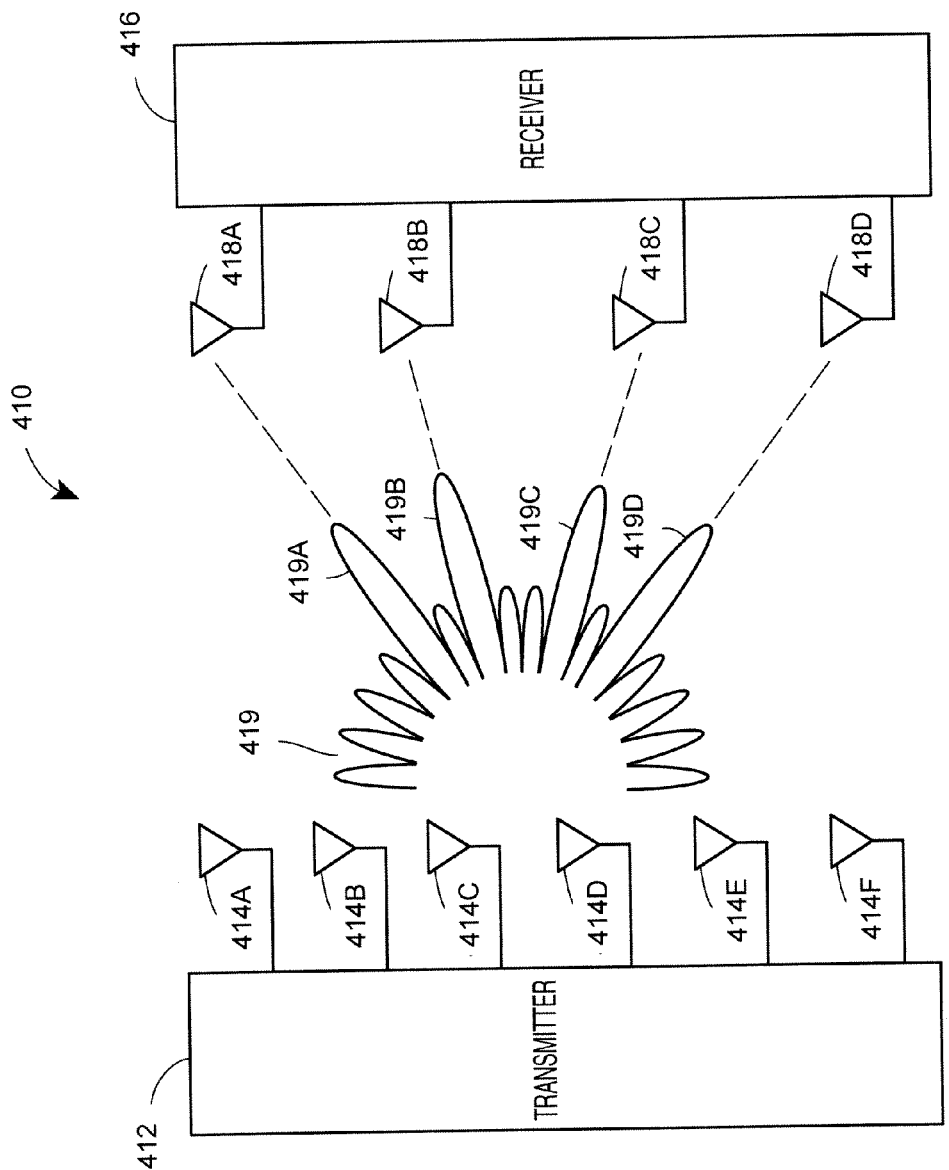
FIG. 5 is a block diagram illustrating a transmit gain pattern for wireless communications between a single transmitter and a single receiver implementing the beamforming technique of FIG. 4.

To illustrate the techniques described herein, FIG. 5 shows a MIMO communication system 410 having a single transmitter 412 with six transmission antennas 414A-414F, and a single receiver 416 with four receiver antennas 418A-418D. In this example, the steering matrix is developed by the transmitter 412 to create a transmit gain pattern 419 as shown disposed next to the transmitter 412 in response to variations estimated in the forward channel by monitoring the reverse channel in the manner described above. As illustrated in FIG. 5, the transmit gain pattern 419 includes multiple high gain lobes 419A-419D generally disposed in the directions of the receiver antennas 418A-418D. The high gain lobes 419A-419D are orientated in the directions of propagation from the transmitter 412 to the particular receiver antennas 418A-418D while lower gain regions, which may even include one or more nulls, are produced in other directions of propagation. While FIG. 5 illustrates a separate high gain lobe directed to each of the receiver antennas 418A-418D, it will be understood that the actual gain pattern produced by the beam steering matrix calculations using beamforming may not necessarily include a separate high gain lobe for each of the receiver antennas 418A-418D. Instead, the gain pattern developed by the beam steering matrix for the transmitter 412 may have a single high gain lobe covering or directed generally to more than one of the receiver antennas 418A-418D. Thus, it is to be understood that the beam pattern resulting from the creation of a steering matrix using beamforming may or may not have separate high gain lobes separated by low gain regions or nulls for each of the receiver antennas.

Of course, developing the beam pattern 419 to have high gain regions and low gain regions may be performed in any desired manner and location. For example, any of the components within the receiver 16 of FIG. 1, including the controller 40, the steering matrix calculation unit 48 and the channel determination unit 39 may initially determine the CSI or other measured description of the forward channel, derive the R matrix from QR decomposition of the resulting description and, if desired may determine the right singular matrixes for the forward channel from the R matrix. The receiver 16 may then send any of this determined information to the transmitter 12.

Of course, the beamforming technique described herein is not limited to being used in a transmitter of a MIMO communication system communicating with a single receiver of the MIMO communication system, but can additionally be applied when a transmitter of a MIMO communication system is communicating with multiple receivers, each of which has one or more receiver antennas associated therewith. For example, a MIMO system (not shown) may also include a single transmitter having multipletransmitter antennas transmits to multiple receivers, each having multiple receiver antennas, respectively. The MIMO system could include different numbers of receiver antennas, including only a single receiver antenna if so desired. In any event, as illustrated by the transmit gain pattern 240 illustrated in FIG. 5, the steering matrix calculated and used by the transmitter 412 is formed using steering information generated by one or more of the transmitter 412 and/or the receiver 416, or receivers if more than one provided.

In one example, the transmitter steering matrix may be calculated or determined using steering information generated by each of the receivers, so that a high gain lobe is directed to at least one receiver antenna of each of the receivers at the same time. However, the steering matrix need not necessarily produce a high gain lobe directed to all of the receiver antennas of each of the receivers, and not necessarily to all of the receiver antennas for any particular one of the receivers. Thus, the steering matrix for the transmitter is determined in such a manner that a separate high gain lobe is directed to each of the receiver antennas. However, due to the physical location of the receiver and its antennas with respect to the transmitter, a single high gain lobe directed to the receiver antennas results in a single high gain lobe in the transmit gain pattern directed to all of these receiver antennas.

On the other hand, the transmitter may develop a different steering matrix for each of the receivers using steering information generated by each of these receivers, and may use those steering matrixes to beamform to the separate or different receivers at different times or using different channels, e.g., OFDM channels, of the system.

While, in many cases, it will be desirable to beamform in such a way to direct a high gain lobe to at least one receiver antenna from each receiver, it may not be necessary to implement this requirement in all cases. For example, a particular receiver may be in a direct line of sight from the transmitter to another receiver and therefore may be disposed in a high gain region of the transmitter and may thus adequately receive the transmitted signals from the transmitter without utilizing steering information generated by that receiver. As another example, a particular receiver may be disposed in a low gain region associated with the transmitter, but may be disposed relatively close to the transmitter so that the particular receiver adequately receives the signals transmitted by the transmitter without utilizing steering information generated by that receiver. Of course, if desired, the number and location (identity) of the receivers used in calculating the transmitter steering matrix can be determined in any manner, including by trial and error, in determining an acceptable or optimal steering matrix using steering information generated by more than one receiver. Still further, while the maximum gains of the high gain lobes of the transmit gain pattern shown in FIG. 5 are shown as being the same, the steering matrix calculation units 28 and 48 may develop steering matrixes which produce high gain lobes with differing maximum gains.

While the beamforming techniques described herein are described in one example as being implemented in hardware, these calculations alternatively or additionally be implemented in software stored in, for example, one of the memories 21, 41 and implemented on a processor associated with one or both of the controllers 20, 40, the steering matrix calculation units 28, 48, or other units of the MIMO communication system 10 of FIG. 1, or implanted in firmware as desired. If implemented in software, the routines may be stored in any computer readable memory such as in RAM, ROM, flash memory, a magnetic disk, a laser disk, or other storage medium. Likewise, this software may be delivered to a MIMO system device (such as a transmitter or a receiver) via any known or desired delivery method including, for example, over a communication channel such as a telephone line, the Internet, a wireless connection, etc., or via a transportable medium, such as a computer-readable disk, flash drive, etc.

More generally, the various blocks, operations, and techniques described above may be implemented in hardware, firmware, software, or any combination of hardware, firmware, and/or software. When implemented in hardware, some or all of the blocks, operations, techniques, etc. may be implemented in, for example, a custom integrated circuit (IC), an application specific integrated circuit (ASIC), a field programmable logic array (FPGA), a programmable logic array (PLA), etc.

When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism.

It is to be understood that the example beamforming methods described above may be implemented by devices other than the example devices of FIG. 1. More generally, the beamforming techniques described above may be utilized in various MIMO devices including devices that do not utilize OFDM modulation (e.g., devices that utilize single carrier modulation techniques). For example, steering matrix calculation techniques such as described above may be utilized in base stations, access points, wireless routers, etc. Additionally, steering matrix calculation techniques such as described above may be utilized in devices that incorporate MIMO-based communication modules, such as MIMO-based WLAN modules. Such devices include electronic consumer products that incorporate MIMO-based communication modules, mobile electronic devices that incorporate MIMO-based communication modules, vehicles that incorporate MIMO-based communication modules, etc.

The beamforming techniques may be embodied in any type of wireless communication system including, for example, ones used in wireless computer systems such as those implemented via a local area network or a wide area network, internet, cable and satellite based communication systems (such as internet, data, video and voice communication systems), wireless telephone systems (including cellular phone systems, voice over internet protocol (VoIP) systems, home-based wireless telephone systems, etc.) Referring now to FIGS. 6A-6H, various example devices that may embody the forward channel variation detection techniques are shown.

Figure 6A:
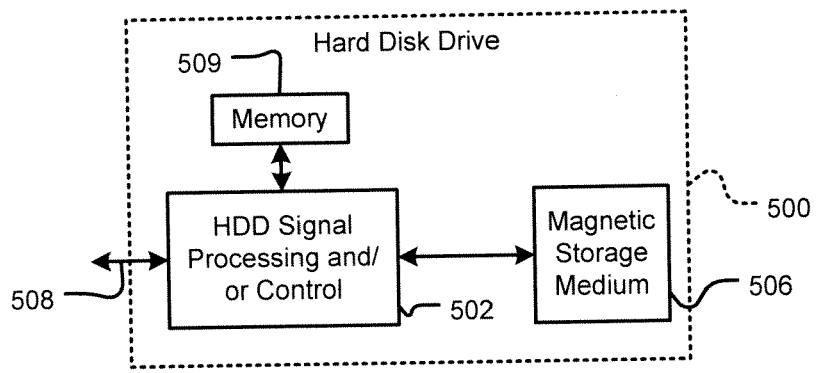
FIGS. 6A-6H illustrate examples of various different devices in which a wireless communication system implementing the antenna selection and training techniques described herein may be used.

Referring to FIG. 6A, the beamforming techniques may be used with a hard disk drive 500 which includes both signal processing and/or control circuits, which are generally identified in FIG. 6A at 502. In some implementations, signal processing and/or control circuit 502 and/or other circuits (not shown) in HDD 500 may process data, perform coding and/or encryption, perform calculations, and/or format data that is output to and/or received from a magnetic storage medium 506.

HDD 500 may communicate with a host device (not shown) such as a computer, mobile computing devices such as personal digital assistants, cellular phones, media or MP3 players and the like, and/or other devices via one or more wired or wireless communication links 508 which may implement the beamforming techniques described above. HDD 500 may be connected to memory 509, such as a random access memory (RAM), a low latency nonvolatile memory such as flash memory, read only memory (ROM) and/or other suitable electronic data storage.

Figure 6B:
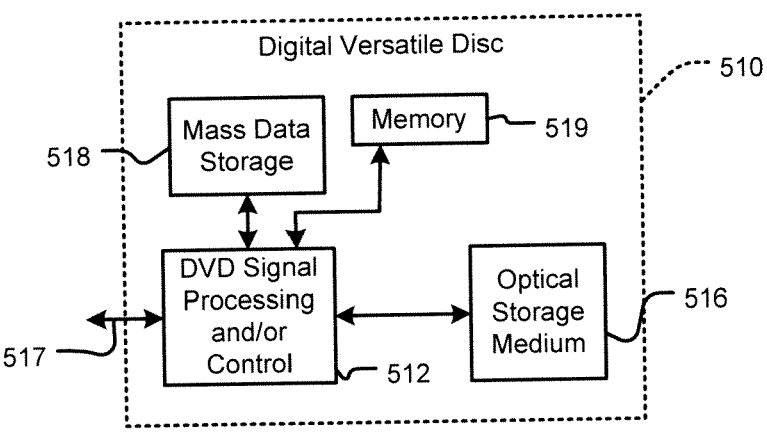

Referring now to FIG. 6B, the beamforming techniques may be embodied in or used with a digital versatile disc (DVD) drive 510 which may include either or both signal processing and/or control circuits, which are generally identified in FIG. 6B at 512, and/or mass data storage 518 of DVD drive 510. Signal processing and/or control circuit 512 and/or other circuits (not shown) in DVD 510 may process data, perform coding and/or encryption, perform calculations, and/or format data that is read from and/or data written to an optical storage medium 516. In some implementations, signal processing and/or control circuit 512 and/or other circuits (not shown) in DVD 510 can also perform other functions such as encoding and/or decoding and/or any other signal processing functions associated with a DVD drive.

DVD drive 510 may communicate with an output device (not shown) such as a computer, television or other device via one or more wired or wireless communication links 517 which may be implemented using the beamforming techniques described above. DVD 510 may communicate with mass data storage 518 that stores data in a nonvolatile manner. Mass data storage 518 may include a hard disk drive (HDD) such as that shown in FIG. 6A. The HDD may be a mini HDD that includes one or more platters having a diameter that is smaller than approximately 1.8". DVD 410 may be connected to memory 519, such as RAM, ROM, low latency nonvolatile memory such as flash memory, and/or other suitable electronic data storage.

The beamforming techniques described above may be utilized in various MIMO devices, or any OFDM-based communication system that estimate channel gain. For example, beamforming techniques such as described above may be utilized in base stations, access points, wireless routers, etc. Additionally, FIGS. 6A-6H illustrate various devices in which beamforming techniques such as described above, may be employed. Although the above has references many aspects of the IEEE Standard 802.11x communication standards, including 802.11n in particular, it should be understood that the beamforming techniques may also be applied to different wireless standards, including, but not limited to, the IEEE 802.16 Wireless MAN standard, also referred to as Worldwide Interoperability for Microwave Access (WiMAX) (i.e., 802.16a/d/e), or other systems employing the IEEE 802.16x family of communication standards, Digital Video Broadcasting—Terrestrial (DVB-T), Digital Audio Broadcasting (DAB), and Long Term Evolution (LTE).

Figure 6C:
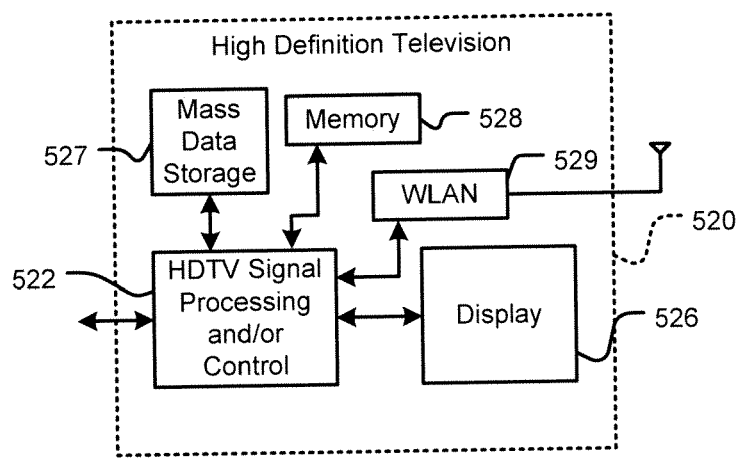

Referring now to FIG. 6C, the beamforming techniques may be embodied in a high definition television (HDTV) 520 which may include either or both signal processing and/or control circuits, which are generally identified in FIG. 6C at 522, a WLAN interface and/or mass data storage of the HDTV 520. HDTV 520 receives HDTV input signals in either a wired or wireless format and generates HDTV output signals for a display 526. In some implementations, signal processing circuit and/or control circuit 522 and/or other circuits (not shown) of HDTV 520 may process data, perform coding and/or encryption, perform calculations, format data and/or perform any other type of HDTV processing that may be required.

HDTV 420 may communicate with mass data storage 527 that stores data in a nonvolatile manner such as optical and/or magnetic storage devices. At least one HDD may have the configuration shown in FIG. 6A and/or at least one DVD may have the configuration shown in FIG. 6B. The HDD may be a mini HDD that includes one or more platters having a diameter that is smaller than approximately 1.8". HDTV 520 may be connected to memory 528 such as RAM, ROM, low latency nonvolatile memory such as flash memory and/or other suitable electronic data storage. HDTV 520 also may support connections with a WLAN via a WLAN network interface 529 which may implement the beamforming techniques described above.

Figure 6D:
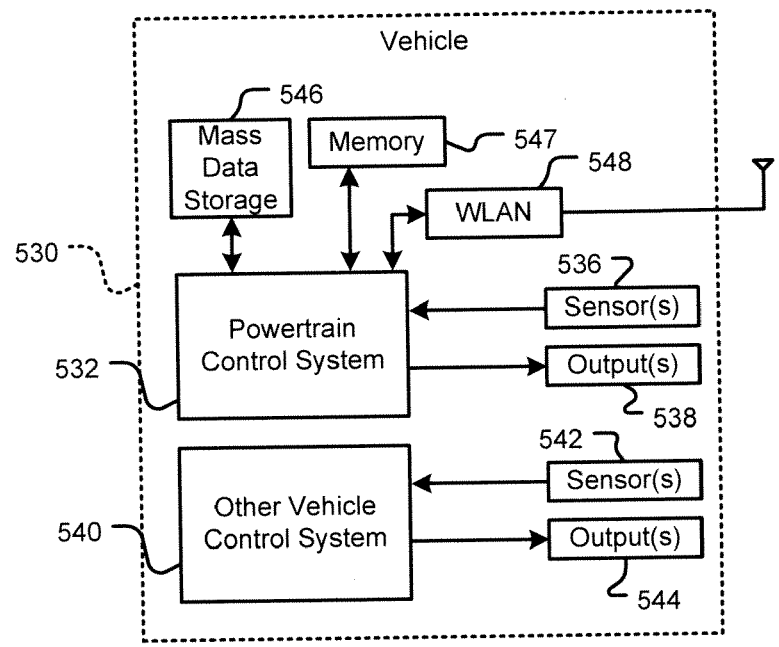

Referring now to FIG. 6D, the beamforming techniques may be used in conjunction with a control system of a vehicle 530 having a WLAN interface and/or mass data storage. In some implementations, the beamforming techniques may be used within a powertrain control system 532 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The beamforming techniques may also be embodied in other control systems 540 of vehicle 530. Control system 540 may likewise receive signals from input sensors 542 and/or output control signals to one or more output devices 544. In some implementations, control system 540 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 532 may communicate with mass data storage 546 that stores data in a nonvolatile manner. Mass data storage 546 may include optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". Powertrain control system 532 may be connected to memory 547 such as RAM, ROM, low latency nonvolatile memory such as flash memory and/or other suitable electronic data storage. Powertrain control system 532 also may support connections with a WLAN via a WLAN network interface 548 which may implement the beamforming techniques described above. The control system 540 may also include mass data storage, memory and/or a WLAN interface (all not shown).

Figure 6E:
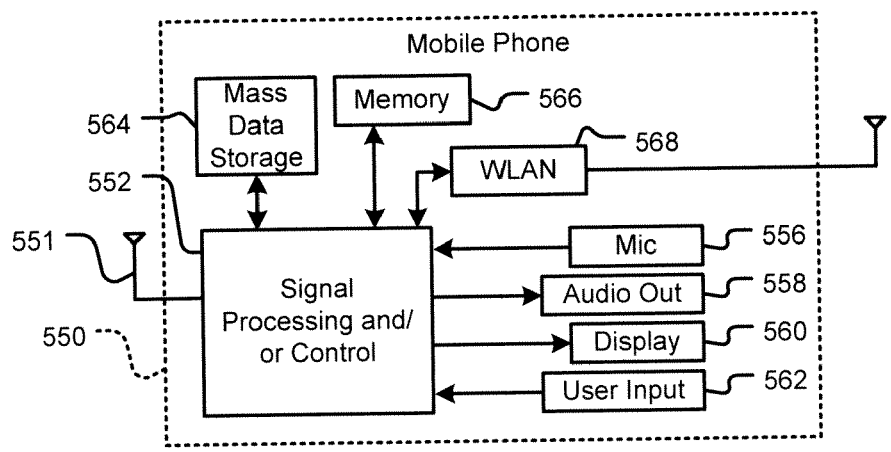

Referring now to FIG. 6E, the beamforming techniques may be embodied in a cellular phone 550 that may include one or more cellular antennas 551, either or both signal processing and/or control circuits, which are generally identified in FIG. 6E at 552, a WLAN interface and/or mass data storage of the cellular phone 550. In some implementations, cellular phone 550 includes a microphone 565, an audio output 558 such as a speaker and/or audio output jack, a display 560 and/or an input device 562 such as a keypad, pointing device, voice actuation and/or other input device. Signal processing and/or control circuits 552 and/or other circuits (not shown) in cellular phone 550 may process data, perform coding and/ or encryption, perform calculations, format data and/or perform other cellular phone functions.

Cellular phone 550 may communicate with mass data storage 564 that stores data in a nonvolatile manner such as optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". Cellular phone 550 may be connected to memory 566 such as RAM, ROM, low latency nonvolatile memory such as flash memory and/or other suitable electronic data storage. Cellular phone 550 also may support connections with a WLAN via a WLAN network interface 568.

Figure 6F:
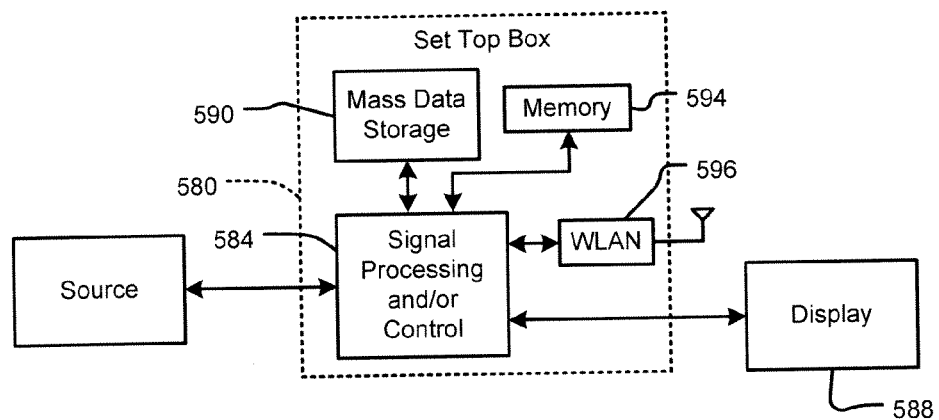

Referring now to FIG. 6F, the beamforming techniques may be embodied in a set top box 580 including either or both signal processing and/or control circuits, which are generally identified in FIG. 6F at 584, a WLAN interface and/or mass data storage of the set top box 580. Set top box 580 receives signals from a source such as a broadband source and outputs standard and/or high definition audio/video signals suitable for a display 588 such as a television and/or monitor and/or other video and/or audio output devices. Signal processing and/or control circuits 584 and/or other circuits (not shown) of the set top box 580 may process data, perform coding and/or encryption, perforin calculations, format data and/or perform any other set top box function.

Set top box 580 may communicate with mass data storage 590 that stores data in a nonvolatile manner. Mass data storage 590 may include optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". Set top box 580 may be connected to memory 594 such as RAM, ROM, low latency nonvolatile memory such as flash memory and/or other suitable electronic data storage. Set top box 580 also may support connections with a WLAN via a WLAN network interface 596 which may implement the beamforming techniques described herein.

Figure 6G:
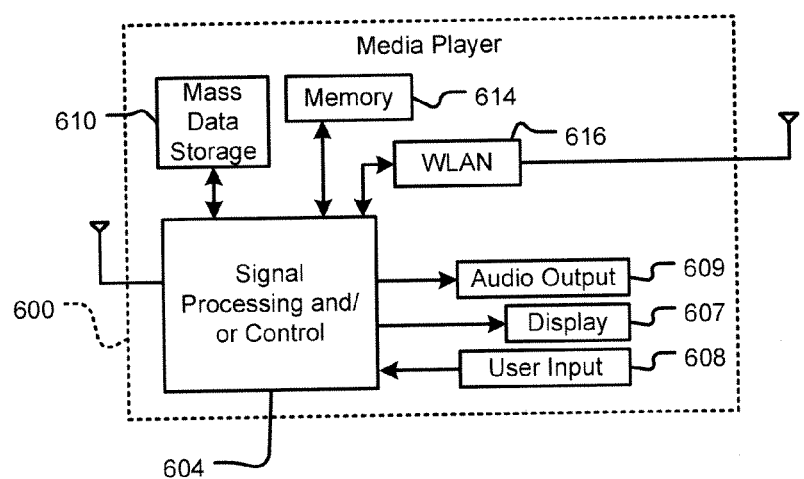

Referring now to FIG. 6G, the beamforming techniques may be embodied in a media player 600. The beamforming techniques may implement either or both signal processing and/or control circuits, which are generally identified in FIG. 6G at 604, a WLAN interface and/or mass data storage of the media player 600. In some implementations, media player 600 includes a display 607 and/or a user input 608 such as a keypad, touchpad and the like. In some implementations, media player 600 may employ a graphical user interface (GUI) that typically employs menus, drop down menus, icons and/or a point-and-click interface via display 607 and/or user input 608. Media player 600 further includes an audio output 609 such as a speaker and/or audio output jack. Signal processing and/or control circuits 604 and/or other circuits (not shown) of media player 600 may process data, perform coding and/or encryption, perform calculations, format data and/or perform any other media player function.

Media player 600 may communicate with mass data storage 610 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". Media player 600 may be connected to memory 614 such as RAM, ROM, low latency nonvolatile memory such as flash memory and/or other suitable electronic data storage. Media player 600 also may support connections with a WLAN via a WLAN network interface 616 which may implement the beamforming techniques described herein. Still other implementations in addition to those described above are contemplated.

Figure 6H:
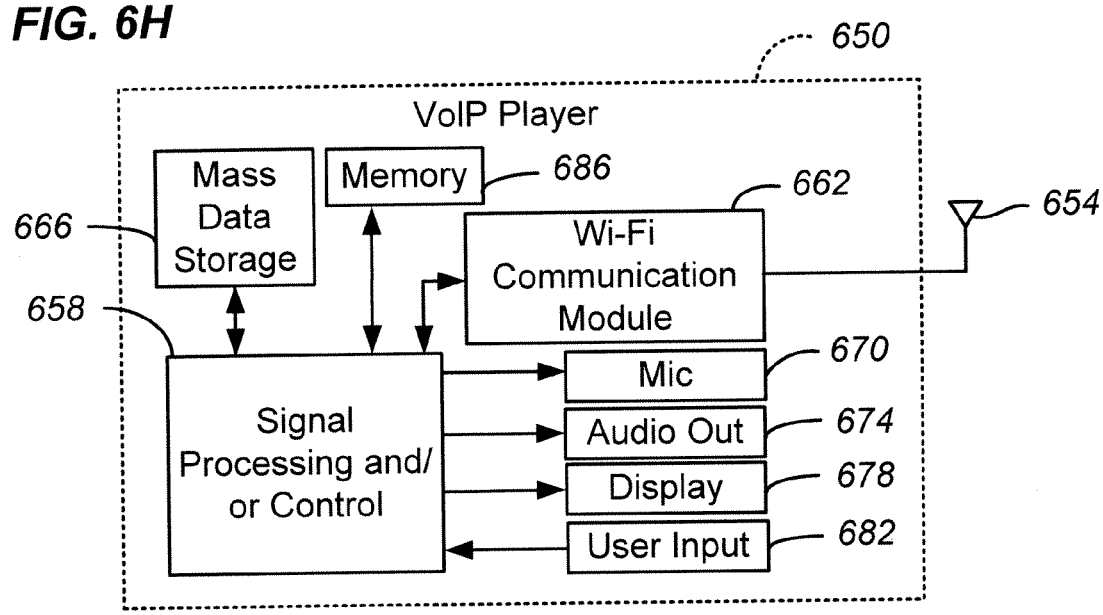

Referring to FIG. 6H, the beamforming techniques may be embodied in a Voice over Internet Protocol (VoIP) phone 650 that may include one or more antennas 654, either or both signal processing and/or control circuits, which are generally identified in FIG. 6H at 658, and a wireless interface and/or mass data storage of the VoIP phone 650. In some implementations. VoIP phone 650 includes, in part, a microphone 670, an audio output 674 such as a speaker and/or audio output jack, a display monitor 678, an input device 682 such as a keypad, pointing device, voice actuation and/or other input devices, and a Wireless Fidelity (Wi-Fi) communication module 662. Signal processing and/or control circuits 658 and/or other circuits (not shown) in VoIP phone 650 may process data, perform coding and/or encryption, perform calculations, format data and/or perform other VoIP phone functions.

VoIP phone 650 may communicate with mass data storage 666 that stores data in a nonvolatile manner such as optical and/or magnetic storage devices, for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". VoIP phone 650 may be connected to memory 686, which may be a RAM, ROM, low latency nonvolatile memory such as flash memory and/or other suitable electronic data storage. VoIP phone 650 is configured to establish communications link with a VoIP network (not shown) via Wi-Fi communication module 662 which may implement the beamforming techniques described herein.

As least some of the various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

Moreover, while the beamforming techniques have been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method of providing forward channel matrix information within a communication system, the communication system having i) a first transceiver device having a first plurality of antennas and ii) a second transceiver device having a second plurality of antennas, the method comprising:
    determining a channel estimation matrix describing a forward channel in which a signal travels from the first transceiver device to the second transceiver device;
    decomposing the channel estimation matrix to derive a unitary matrix and an upper triangular matrix at the second transceiver device; and
    transmitting at least a portion of the upper triangular matrix to the first transceiver device, wherein transmitting at least a portion of the upper triangular matrix further comprises transmitting diagonal and upper-diagonal matrix elements of the upper triangular matrix to the first transceiver device,
    wherein the upper triangular matrix is reconstructed from the diagonal and upper-diagonal matrix elements of the upper triangular matrix at the first transceiver device,
    wherein the upper triangular matrix is used to develop a precoding matrix, and
    wherein the precoding matrix is used to control transmission of a modulated signal via the first plurality of antennas.

2. The method of claim 1, wherein transmitting the diagonal and upper-diagonal matrix elements of the upper triangular matrix to the first transceiver device further comprises transmitting each diagonal and upper-diagonal element of the upper triangular matrix without quantization using analog communication feedback.

3. The method of claim 1, wherein transmitting the diagonal and upper-diagonal matrix elements of the upper triangular matrix to the first transceiver device further comprises:
    quantizing each diagonal and upper-diagonal element of the upper triangular matrix to derive quantized coefficients of the diagonal and upper-diagonal matrix elements;
    encoding the quantized coefficients with error correcting codes; and
    transmitting the encoded quantized coefficients to the first transceiver device using digital communication feedback.

4. The method of claim 1, further comprising transmitting the precoding matrix to the first transceiver device.

5. The method of claim 1, wherein decomposing the channel estimation matrix to derive a unitary matrix and an upper triangular matrix at the second transceiver device comprises decomposing the channel estimation matrix to derive the unitary matrix and the upper triangular matrix as part of a signal-to-noise calculation routine.

6. The method of claim 1, wherein the upper triangular matrix is decomposed to develop the precoding matrix using singular value decomposition to derive a unitary matrix, a diagonal matrix and a conjugate transpose of the precoding matrix.

7. The method of claim 1, further comprising:
    normalizing matrix elements of the upper triangular matrix by an element in a first column and first row of the upper triangular matrix; and
    transmitting all normalized diagonal and upper-diagonal matrix elements of the upper triangular matrix except the normalized element in the first column and first row of the upper triangular matrix to the first transceiver device.

8. The method of claim 1, further comprising:
    normalizing matrix elements of the upper triangular matrix by a standard deviation of noise in the forward channel determined from a signal-to-noise calculation; and
    transmitting all normalized diagonal and upper-diagonal matrix elements of the upper triangular matrix to the first transceiver device.

9. An apparatus comprising:
    a controller configured to determine a description of a forward channel based on a signal from a beamformer; and
    a QR decomposition processor configured to decompose the description of the forward channel, wherein the decomposed description of the forward channel comprises a Q matrix and an upper triangular R matrix, and wherein the upper triangular R matrix comprises diagonal, upper-diagonal and lower-diagonal matrix elements;
    wherein the controller is configured to feed back to the beamformer, via a feedback channel resource having a bandwidth allocated to channel state information feedback, at least one of:
        (1) a precoding matrix calculated from the upper triangular R matrix, the precoding matrix to be used by the beamformer to produce a transmit gain pattern, and
        (2) the diagonal and upper-diagonal matrix elements of the upper triangular R matrix, wherein the upper triangular R matrix is reconstructed from the diagonal and upper-diagonal matrix elements of the upper triangular R matrix at the beamformer.

10. The apparatus of claim 9, further comprising a precoding matrix generator to calculate the precoding matrix from the R matrix.

11. The apparatus of claim 10, wherein the precoding matrix generator comprises a singular value decomposition (SVD) calculator to calculate an SVD based on the R matrix.

12. The apparatus of claim 9, wherein the controller is configured to feedback each diagonal and upper-diagonal matrix element of the R matrix without quantization using analog communication feedback.

13. The apparatus of claim 9, wherein the controller is configured to quantize each diagonal and upper-diagonal matrix element of the R matrix to derive quantized coefficients of the diagonal and upper-diagonal matrix elements, encode the quantized coefficients with error correcting codes, and feed back the encoded quantized coefficients to the beamformer using digital communication feedback.

14. The apparatus of claim 9, further comprising a signal-to-noise ratio (SNR) calculation unit to generate SNR values associated with the forward channel, wherein the SNR calculation unit comprises the QR decomposition processor and wherein the description of the forward channel is decomposed to generate the Q matrix and the R matrix as part of the generation of the SNR values by the SNR calculation unit.

15. The apparatus of claim 14, wherein the controller is configured to normalize the diagonal and upper-diagonal matrix elements of the R matrix by a standard deviation of the SNR values associated with the forward channel, and feed back the normalized diagonal and upper-diagonal matrix elements of the R matrix to the beamformer via the feedback channel resource.

16. The apparatus of claim 9, wherein the controller is configured to normalize the diagonal and upper-diagonal matrix elements of the R matrix by a matrix element in a first column and first row of the R matrix, and feed back the normalized diagonal and upper-diagonal matrix elements of the R matrix except the normalized matrix element in the first column and first row of the R matrix to the beamformer via the feedback channel resource.

17. An apparatus comprising:
a beamforming network coupled to a plurality of transmission antennas; and
a controller configured to control the beamforming network using a precoding matrix so as to produce a transmit gain pattern having one or more high gain lobes via the plurality of transmission antennas based on the precoding matrix,
wherein the precoding matrix is calculated from an upper triangular R matrix derived from a QR decomposition of a description of a forward channel, wherein the decomposed description of the forward channel comprises a Q matrix and the R matrix,
wherein the controller is configured to receive diagonal and upper-diagonal matrix elements of the upper triangular R matrix from a beamformee, and
wherein the controller is configured to reconstruct the upper triangular R matrix from the diagonal and upper-diagonal matrix elements.

18. The apparatus of claim 17, wherein the controller is configured to receive the precoding matrix from a beamformee via a feedback channel resource having a bandwidth allocated to channel state information feedback.

19. The apparatus of claim 17, wherein the controller is configured to receive diagonal and upper-diagonal matrix elements of the R matrix from a beamformee via a feedback channel resource having a bandwidth allocated to channel state information feedback, the apparatus further comprising a precoding matrix generator to calculate the precoding matrix from the R matrix.

20. The apparatus of claim 19, wherein the precoding matrix generator comprises a singular value decomposition (SVD) calculator to calculate an SVD based on the R matrix.

21. The apparatus of claim 19, wherein the controller is configured to receive the diagonal and upper-diagonal matrix elements of the R matrix without quantization using analog communication feedback from a beamformee.

22. The apparatus of claim 19, wherein the controller is configured to receive quantized coefficients of matrix elements derived from a quantization of each diagonal and upper-diagonal matrix element of the R matrix and encoded with error correcting codes, wherein the encoded quantized coefficients are received using digital communication feedback from the beamformee via the feedback channel resource.

23. The apparatus of claim 19, wherein the controller is configured to receive diagonal and upper-diagonal matrix elements of the R matrix normalized by a standard deviation of SNR values associated with the forward channel, wherein the normalized diagonal and upper-diagonal matrix elements of the R matrix are received from the beamformee via the feedback channel resource.

24. The apparatus of claim 19, wherein the controller is configured to receive diagonal and upper-diagonal matrix elements of the R matrix normalized by a matrix element in a first column and first row of the R matrix, wherein the normalized diagonal and upper-diagonal matrix elements of the R matrix, except the normalized matrix element in the first column and first row of the R matrix, are received from the beamformee via the feedback channel resource.

25. A method of beamforming using forward channel matrix information within a communication system having a first transceiver device having a first plurality of antennas and a second transceiver device having a second plurality of antennas, the method comprising:
receiving at least one of:
(1) a precoding matrix from the second transceiver device, wherein the precoding matrix is calculated from an upper triangular matrix derived from a decomposition of a channel estimation matrix describing a forward channel in which a signal travels from the first transceiver device to the second transceiver device, wherein the decomposed description of the forward channel comprises a unitary matrix and the upper triangular matrix, the upper triangular matrix comprising diagonal, upper-diagonal and lower-diagonal matrix elements, and
(2) at least a portion of the upper triangular matrix;
developing a precoding matrix from the at least a portion of upper triangular matrix, if at least a portion of the upper triangular matrix is received from the second transceiver device;
controlling transmission of a modulated signal via the first plurality of antennas using the developed precoding matrix; and
controlling transmission of a modulated signal via the first plurality of antennas using the received precoding matrix, if the precoding matrix is received from the second transceiver device.

26. The method of claim 25, wherein receiving at least a portion of the upper triangular matrix further comprises receiving diagonal and upper-diagonal matrix elements of the upper triangular matrix from the second transceiver device, and
wherein developing a precoding matrix comprises reconstructing the upper triangular matrix from the diagonal and upper-diagonal matrix elements of the upper triangular matrix at the first transceiver device.

27. The method of claim 26, wherein receiving at least a portion of the upper triangular matrix further comprises receiving each diagonal and upper-diagonal element of the upper triangular matrix without quantization using analog communication feedback from the second transceiver device.

28. The method of claim 25, wherein developing a precoding matrix comprises decomposing the upper triangular matrix to develop the precoding matrix using singular value decomposition to derive a unitary matrix, a diagonal matrix and a conjugate transpose of the precoding matrix.

29. The method of claim 25, wherein receiving at least a portion of the upper triangular matrix further comprises receiving quantized coefficients of matrix elements derived from a quantization of each diagonal and upper-diagonal matrix element of the upper triangular matrix and encoded with error correcting codes, wherein the encoded quantized coefficients are received using digital communication feedback from the second transceiver device via a feedback channel resource.

30. The method of claim 25, wherein receiving at least a portion of the upper triangular matrix further comprises receiving diagonal and upper-diagonal matrix elements of the upper triangular matrix normalized by a standard deviation of SNR values associated with the forward channel, wherein the normalized diagonal and upper-diagonal matrix elements of the upper triangular matrix are received from the second transceiver device via a feedback channel resource.

31. The method of claim 25, wherein receiving at least a portion of the upper triangular matrix further comprises receiving diagonal and upper-diagonal matrix elements of the upper triangular matrix normalized by a matrix element in a first column and first row of the upper triangular matrix, wherein the normalized diagonal and upper-diagonal matrix elements of the upper triangular matrix, except the normalized matrix element in the first column and first row of the upper triangular matrix, are received from the second transceiver device via a feedback channel resource.

* * * * *